(12) United States Patent
Iwami et al.

(10) Patent No.: US 7,823,611 B2
(45) Date of Patent: Nov. 2, 2010

(54) FILLER CAP OF FUEL TANK

(75) Inventors: Masashi Iwami, 1187-35, Furuto-cho, Ota-shi, Gunma, 373-0826 (JP); Masao Iwami, 1187-35, Furuto-cho, Ota-shi, Gunma, 373-0826 (JP); Mitsuo Kadoi, Tokyo (JP); Masanori Horiuchi, Tokyo (JP)

(73) Assignees: Masashi Iwami, Ota-shi (JP); Masao Iwami, Ota-shi (JP); Fuji Jukogyo Kabushiki Kaisha, Tokyo (JP)

( * ) Notice: Subject to any disclaimer, the term of this patent is extended or adjusted under 35 U.S.C. 154(b) by 737 days.

(21) Appl. No.: 11/802,963

(22) Filed: May 29, 2007

(65) Prior Publication Data

US 2008/0000543 A1    Jan. 3, 2008

(30) Foreign Application Priority Data

May 29, 2006   (JP)  .............................. 2006-148283
Apr. 19, 2007  (JP)  .............................. 2007-110648

(51) Int. Cl.
    *B60K 15/05* (2006.01)
(52) U.S. Cl. .................... 141/303; 141/44; 141/326; 141/350; 137/43; 137/202; 220/86.2
(58) Field of Classification Search ............... 141/44, 141/303, 326, 350; 137/43, 202; 220/86.2
    See application file for complete search history.

(56) References Cited

U.S. PATENT DOCUMENTS

| | | | | |
|---|---|---|---|---|
| 4,696,409 A | * | 9/1987 | Vize | 220/203.2 |
| 4,735,226 A | * | 4/1988 | Szlaga | 137/43 |
| 4,796,777 A | * | 1/1989 | Keller | 220/203.2 |
| 4,913,303 A | * | 4/1990 | Harris | 220/203.21 |

(Continued)

FOREIGN PATENT DOCUMENTS

JP    5-133287    5/1993

(Continued)

*Primary Examiner*—Gregory L Huson
*Assistant Examiner*—Nicolas A Arnett
(74) *Attorney, Agent, or Firm*—Kratz, Quintos & Hanson, LLP

(57) ABSTRACT

An object is to provide a filler cap of a fuel tank capable of securely preventing a disadvantage that, when the fuel tank tilts, fuel stored in the fuel tank is discharged from an air passage disposed at a cap main body. The cap includes the air passage which is constituted at the cap main body and which allows the inside of the fuel tank to communicate with the outside, and a valve mechanism portion constituted at this air passage. The valve mechanism portion includes a tube main body having a tube-like portion and a reduced diameter portion formed externally and continuously from this tube-like portion, a float stored in the tube main body with a space between the float and an inner surface of this tube main body, a piston positioned on a fuel tank side of the float and stored in the tube main body with a space between the piston and the inner surface of the tube main body, and a spherical member positioned on an outer side of the float and stored in the tube main body.

5 Claims, 19 Drawing Sheets

U.S. PATENT DOCUMENTS

| | | | |
|---|---|---|---|
| 5,028,244 A * | 7/1991 | Szlaga | 96/163 |
| 5,183,173 A * | 2/1993 | Heckman | 220/203.07 |
| 5,242,072 A * | 9/1993 | Koebernik | 220/202 |
| 5,960,816 A * | 10/1999 | Mills et al. | 137/202 |
| 6,311,675 B2 * | 11/2001 | Crary et al. | 123/516 |
| 6,321,801 B1 * | 11/2001 | Hagano et al. | 141/301 |
| 6,578,597 B2 * | 6/2003 | Groom et al. | 137/43 |
| 7,261,093 B2 * | 8/2007 | Groom et al. | 123/520 |
| 7,320,314 B2 * | 1/2008 | Kashima et al. | 123/519 |
| 2006/0254641 A1 * | 11/2006 | Callahan et al. | 137/43 |

FOREIGN PATENT DOCUMENTS

JP    6-219461    8/1994

* cited by examiner

FILLER CAP OF FUEL TANK

TECHNICAL FIELD

The present invention relates to a filler cap of a fuel tank with which a fuel inlet is closed in a case where the tank is mounted on, for example, a car (a passenger vehicle, a truck, an agricultural machine, a power generator, a mower, a motorbike, a scooter or a construction machine) and the like.

BACKGROUND ART

Heretofore, a fuel tank for an internal combustion engine is closed with a filler cap in a case where the engine is mounted on a car (a passenger vehicle, a truck, an agricultural machine, a power generator, a mower, a motorbike, a scooter, a construction machine or the like). As fuel stored in the fuel tank is consumed, air needs to be introduced into a container from the outside to compensate for a volume of the consumed fuel of the tank. For this purpose, the filler cap is provided with an air passage. Moreover, in a case where the fuel tank disposed in the car tilts, there is a danger that a large amount of the fuel leaks from the air passage disposed at the filler cap and that the fuel which has leaked catches fire.

Furthermore, when the fuel tank tilts, a liquid surface of the fuel stored in the fuel tank rises above the air passage disposed at the filler cap. When the fuel enters the filler cap from the air passage, the fuel is adsorbed by sponge disposed beforehand in the filler cap. Alternatively, a chamber is disposed at the air passage which communicates with the outside in order to save a time elapsed until the fuel flows outwards. The filler cap structured in this manner does not contain a valve mechanism which stops inflow of the fuel, and has a danger that the fuel which has entered the cap leaks outwards in a short time to develop fire and air pollution.

Furthermore, in some case, a fuel inlet of the fuel tank is provided with a long tube, and a tip end of the tube (the fuel inlet) is closed with the filler cap to prevent the fuel from leaking from the filler cap. However, when the fuel tank falls, the liquid surface of the fuel tank rises above the filler cap at the tip end, and there is not any effect that the fuel is prevented from leaking out of the fuel inlet. In a case where a rollover valve is attached which inhibits the fuel from leaking outwards only when the fuel tank tilts, the outflow of the fuel can be stopped. However, a structure of the fuel tank has to be changed, and the changed structure is inconvenient during oil supply, and becomes expensive.

Another technology is proposed in order to prevent a large amount of the fuel stored in the fuel tank from leaking out of the air passage disposed at the filler cap. That is, the filler cap of the fuel tank is provided with a concave and convex portion forming a meandering passage to constitute a part of the air passage at a gap between an outer lid and a receiving portion for an inner lid. This meandering passage allows an only gas evaporated from the fuel stored in the fuel tank to flow from the filler cap, and the concave and convex portion inhibits the fuel from flowing outwards. In consequence, the leakage of the fuel from the fuel tank to the outside is reduced (e.g., see Japanese Patent Application Laid-Open No. 6-219461).

On the other hand, air pollution due to floating particulate substances and photochemical oxidant raises a serious problem. Even at present, an adverse influence of the floating particulate substances on human health is regarded as a problem, and the problem needs to be solved urgently. Moreover, VOC (generic organic compounds which change to a gas in the atmosphere) is one of the substances, and examples of VOC include toluene, xylene, ethyl acetate and fuel (gasoline). It is also regarded as a problem that the VOC gas evaporated from the fuel stored in the fuel tank is discharged from the air passage disposed at the filler cap to the atmosphere.

To solve the problem, it is also proposed that a disadvantage that the gas evaporated from the fuel stored in the fuel tank is discharged to the atmosphere should be prevented. In this case, the fuel tank is successively connected to the rollover valve, a canister and the engine via a piping line. Moreover, when the engine stops (the fuel tank is horizontally disposed), the gas evaporated in the fuel tank is adsorbed by an active carbon disposed at the canister. Moreover, when the engine starts, the gas adsorbed by the active carbon is desorbed, and the gas is sucked into the engine via a vaporizer and burnt. In consequence, the gas evaporated from the fuel stored in the fuel tank is prevented from being discharged from the filler cap to the atmosphere (e.g., see Japanese Patent Application Laid-Open No. 5-133287).

However, the filler cap of the former fuel tank has an effect of reducing the leakage of the fuel to the outside in a case where the fuel tank tilts. However, when the tilted state of the fuel tank continues for a predetermined time, an increasing amount of the fuel leaks from the air passage disposed at the filler cap. Therefore, there is still a danger that the fuel which has leaked catches fire.

Moreover, the latter fuel tank is connected to the rollover valve and the canister via the piping line, and the active carbon is disposed in this canister. Furthermore, the gas evaporated from the fuel stored in the fuel tank is adsorbed/desorbed with respect to the active carbon and burnt by the engine to prevent the fuel from being discharged from the filler cap to the atmosphere. However, the fuel tank requires the rollover valve for preventing the fuel from entering the canister from the fuel tank. Therefore, there has still been a problem that cost of the engine increases.

Moreover, there has been a demand for development of an inexpensive filler cap having a satisfactory appearance in which the fuel does not easily flow from the air passage of the filler cap at a time when the fuel tank tilts.

The present invention has been developed to solve such a problem of the conventional technology, and an object thereof is to provide a filler cap of a fuel tank capable of securely preventing a disadvantage that fuel stored in the fuel tank leaks from an air passage disposed at a cap main body.

SUMMARY OF THE INVENTION

That is, a filler cap of a fuel tank according to a first invention comprises a cap main body attached to a fuel inlet of the fuel tank, further comprising: an air passage which is constituted at the cap main body and which allows the inside of the fuel tank to communicate with the outside; and a valve mechanism portion constituted at this air passage, and characterized in that this valve mechanism portion includes a tube main body having a tube-like portion and a reduced diameter portion formed externally and continuously from this tube-like portion, a float stored in the tube main body with a space between the float and an inner surface of this tube main body, a piston positioned on a fuel tank side of this float and stored in the tube main body with a space between the piston and the inner surface of the tube main body, and a spherical member positioned on an outer side of the float and stored in the tube main body and that, in a case where the fuel enters the tube main body, the piston moves toward the outside, the float floats toward the outside and the spherical member is pressed onto the reduced diameter portion of the tube main body by the float to close the air passage.

Moreover, according to a second invention, the filler cap of the fuel tank described above is characterized by further comprising: a pipe which is rotatably attached to the cap main body to communicate with the air passage and which is connected to a canister or a vaporizer via a hose.

Furthermore, according to a third invention, the filler cap of the fuel tank in the first or second invention is characterized in that the piston is provided with a function of the float and that, in a case where the fuel enters the tube main body, the piston obtains buoyancy to float toward the outside together with the float.

In addition, according to a fourth invention, the filler cap of the fuel tank in any of the first to third inventions is characterized in that the piston constantly allows the fuel to flow through the space between the piston and the inner surface of the tube main body and that, in a case where the piston moves toward the outside, the space between the piston and the inner surface of the tube main body is set to such a dimension that the fuel cannot flow through the space, before the spherical member is pressed onto the reduced diameter portion of the tube main body by the float.

Moreover, according to a fifth invention, the filler cap of the fuel tank described above is characterized by further comprising: a fuel passage permitting portion which is formed at an outer portion of a side surface of the piston and which permits the fuel to flow through the space between the piston and the inner surface of the tube main body; and a closing portion which is formed at the side surface of the piston on the side of the fuel tank from the fuel passage permitting portion and which is disposed close to the inner surface of the tube main body than the fuel passage permitting portion. A space between this closing portion and the inner surface of the tube main body is set to such a dimension that the fuel flows through the space. In a case where the piston moves toward the outside, the closing portion moves to a position where the closing portion faces the inner surface of the tube main body, and the space between the closing portion and the inner surface of the tube main body is set to such a dimension that the fuel does not flow through the space.

The first invention is the filler cap comprising the cap main body attached to the fuel inlet of the fuel tank, and further comprises: the air passage which is constituted at the cap main body and which allows the inside of the fuel tank to communicate with the outside; and the valve mechanism portion constituted at this air passage. The valve mechanism portion includes the tube main body having the tube-like portion and the reduced diameter portion formed externally and continuously from the tube-like portion, the float stored in the tube main body with the space between the float and the inner surface of the tube main body, the piston positioned on the fuel tank side of the float and stored in the tube main body with the space between the piston and the inner surface of the tube main body, and the spherical member positioned on the outer side of the float and stored in the tube main body. In a case where the fuel enters the tube main body, the piston moves toward the outside, the float floats toward the outside and the spherical member is pressed onto the reduced diameter portion of the tube main body by the float to close the air passage. Therefore, for example, when the fuel tank tilts and the fuel enters the tube main body, the air passage can momentarily be closed with the spherical member.

In consequence, it is possible to prevent a disadvantage that the fuel stored in the fuel tank flows from the air passage disposed at the filler cap as in the conventional technology. Therefore, it is possible to inhibit in advance a danger that the fuel flows from the air passage disposed at the filler cap and that the fuel which has flowed outwards catches fire. It is also possible to disadvantage that plant is damaged by the fuel which has flowed from the air passage disposed at the cap main body. Therefore, convenience of the filler cap of the fuel tank can largely be improved.

Especially, the filler cap is provided with the valve mechanism portion without changing any appearance, and a disadvantage that the fuel stored in the fuel tank flows from the air passage disposed at this valve mechanism portion is prevented. In consequence, it is possible to provide the inexpensive filler cap of the fuel tank having a satisfactory appearance.

Moreover, according to the second invention, the filler cap tank described above further comprises the pipe which is rotatably attached to the cap main body to communicate with the air passage and which is connected to the canister or the vaporizer via the hose. Therefore, the gas evaporated from the fuel stored in the fuel tank mounted on a car such as an agricultural machine, a power generator, a mower, a motorbike, a scooter or a construction machine (Yumbo (a hydraulic shovel) or the like) can be introduced into the pipe disposed at the cap main body. In consequence, for example, when the pipe is connected to the canister or the vaporizer via the hose, the gas evaporated from the fuel stored in the fuel tank can be burnt by an engine of the car. Therefore, it is possible to securely prevent environmental pollution caused when a VOC gas generated from the fuel stored in the fuel tank is discharged from the air passage to the atmosphere.

Furthermore, since the pipe is rotatably connected to the cap main body, the filler cap can be rotated in a state in which the pipe is supported in one direction. In consequence, without removing the hose from the filler cap (the pipe), the cap main body can be rotated and attached or detached with respect to the fuel inlet of the fuel tank. Therefore, when the fuel tank is filled with the fuel, a troublesome operation of removing the hose from the cap main body is not necessary, and convenience of the filler cap of the fuel tank can largely be improved.

Especially, the gas evaporated from the fuel stored in the fuel tank can enter the canister and the vaporizer from the pipe attached to the cap main body. Therefore, the gas evaporated from the fuel tank can remarkably easily be burnt by the engine of the car. In consequence, the environmental pollution due to the VOC gas generated from the fuel can be prevented. When the filler cap is simply replaced without modifying the conventional fuel tank, the gas evaporated from the fuel stored in the fuel tank can be allowed to enter the canister and the vaporizer. Therefore, cost can largely be reduced. In consequence, since the VOC gas generated from the fuel stored in the fuel tank can be burnt by the engine without being discharged from the air passage to the atmosphere, the convenience of the filler cap of the fuel tank can generally be improved.

In addition, the filler cap is provided with the valve mechanism portion, and owing to this valve mechanism portion, a disadvantage that the fuel stored in the fuel tank flows from the air passage disposed at the cap main body is prevented. In consequence, since the VOC gas generated from the fuel stored in the fuel tank can be burnt with the engine via the pipe attached to the cap main body, the VOC gas can be prevented from being discharged from the air passage to the atmosphere. Therefore, cost increase of the fuel tank can be suppressed, and the filler cap of the fuel tank having a satisfactory appearance can be provided.

Moreover, according to the third invention, in the first or second invention, the filler cap is constituted so that the piston is provided with the function of the float and so that, in a case where the fuel enters the tube main body, the piston obtains the buoyancy to float toward the outside together with the float. Therefore, it is possible to push up the spherical member with the buoyancies of both the float and the piston. In consequence, since the spherical member can quickly be pressed onto the reduced diameter portion of the tube main body, the air passage can quickly be closed. Therefore, even when the fuel tank tilts and the fuel enters the tube main body, it is possible to further effectively inhibit the fuel from flowing from the air passage.

In addition, according to the fourth invention, in the filler cap of the fuel tank in any of the first to third inventions, the piston constantly allows the fuel to flow through the space between the piston and the inner surface of the tube main body. In a case where the piston moves toward the outside, the space between the piston and the inner surface of the tube main body is set to such a dimension that the fuel cannot flow through the space, before the spherical member is pressed onto the reduced diameter portion of the tube main body by the float. For example, as in the fifth invention, the filler cap further comprises the fuel passage permitting portion which is formed at the outer portion of the side surface of the piston and which permits the fuel to flow through the space between the piston and the inner surface of the tube main body, and the closing portion which is formed at the side surface of the piston on the side of the fuel tank from the fuel passage permitting portion and which is disposed close to the inner surface of the tube main body than the fuel passage permitting portion. The space between the closing portion and the inner surface of the tube main body is constantly set to such a dimension that the fuel flows through the space. In a case where the piston moves toward the outside, the closing portion moves to the position where the closing portion faces the inner surface of the tube main body, and the space between the closing portion and the inner surface of the tube main body is set to such a dimension that the fuel does not flow through the space. In this case, when the fuel tank tilts and the fuel enters the tube main body, the fuel is first inhibited from entering the tube main body by the closing portion and the inner surface of the tube main body. Subsequently, the spherical member can be pressed onto the reduced diameter portion of the tube main body to close the air passage. Therefore, when the fuel tank tilts and the fuel enters the tube main body, the air passage can momentarily be closed. It is therefore possible to further effectively prevent a disadvantage that the fuel which has entered the tube main body flows outwards.

Especially, the air passage can be closed with the closing portion immediately before the piston floats to press the spherical member onto the reduced diameter portion and close the air passage. Therefore, it is possible to prevent in advance a disadvantage that the fuel of the fuel tank flows from the filler cap. In consequence, when the fuel tank tilts, it is possible to securely inhibit a disadvantage that the fuel flows from the gap of the filler cap. Therefore, it is possible to momentarily inhibit a danger that the fuel flows from the filler cap, and the convenience of the filler cap can further be improved.

DETAILED DESCRIPTION OF THE EMBODIMENTS

A main object of the present invention is to prevent fuel stored in a fuel tank from leaking from an air passage disposed at a cap main body. The object to prevent the fuel stored in the fuel tank from leaking from the air passage disposed at the cap main body is realized with a simple structure in which a valve mechanism portion is simply disposed at the air passage constituted at the cap main body.

Embodiment 1

Figure 1:
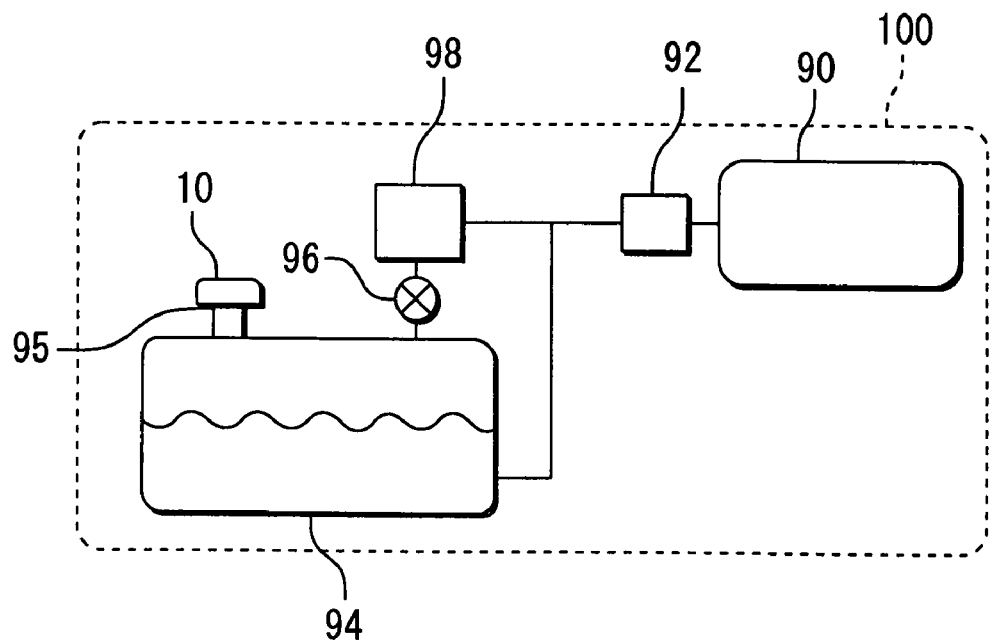
FIG. 1 is a schematic diagram of a car to which a filler cap of a fuel tank of the present invention is applied (Embodiment 1)
Figure 4:
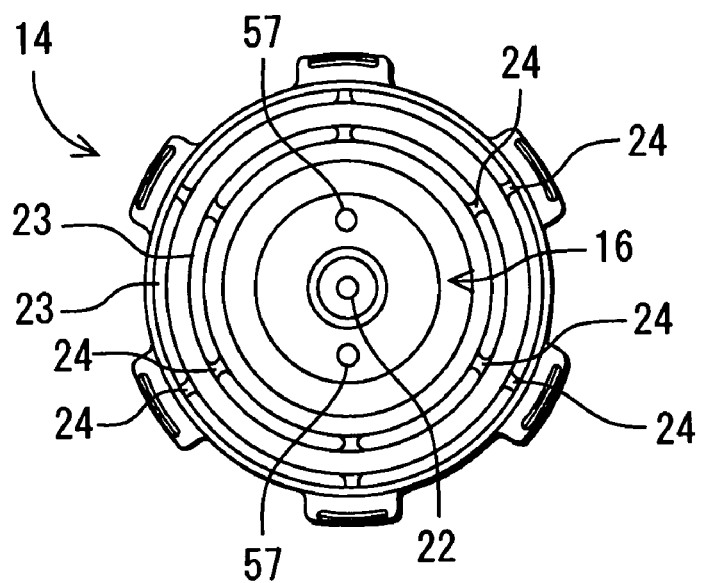
FIG. 4 is a back view of an inner lid constituting the filler cap of the fuel tank of the present invention.
Figure 5:
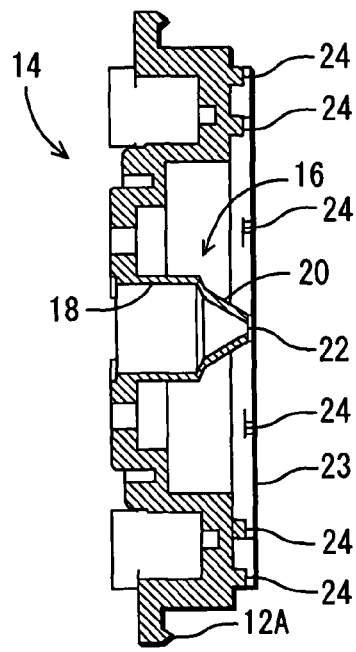
FIG. 5 is a vertically sectional view of the inner lid of FIG. 4.

An embodiment of the present invention will hereinafter be described with reference to the drawings. FIG. 1 shows a schematic diagram of a car 100 to which a filler cap 10 of a fuel tank 94 of the present invention is applied, FIG. 2 shows a plan view of the filler cap 10 of the fuel tank 94 according to the embodiment of the present invention, FIG. 3 shows a back view of the filler cap 10 of the fuel tank 94 of FIG. 2, FIG. 4 shows a back view of an inner lid 14 constituting the filler cap 10 of the fuel tank 94 of the present invention and FIG. 5 shows a vertically sectional view of the inner lid 14 of FIG. 4, respectively.

As shown in FIG. 1, the filler cap 10 of the fuel tank 94 according to the present embodiment closes a fuel inlet 95 of the fuel tank which is mounted on a passenger vehicle, a truck, an agricultural machine, a power generator, a mower, a motorbike, a scooter or a construction machine (hereinafter generically referred to as the car 100) and which supplies fuel (gasoline in the embodiment) to an engine 90.

Figure 2:
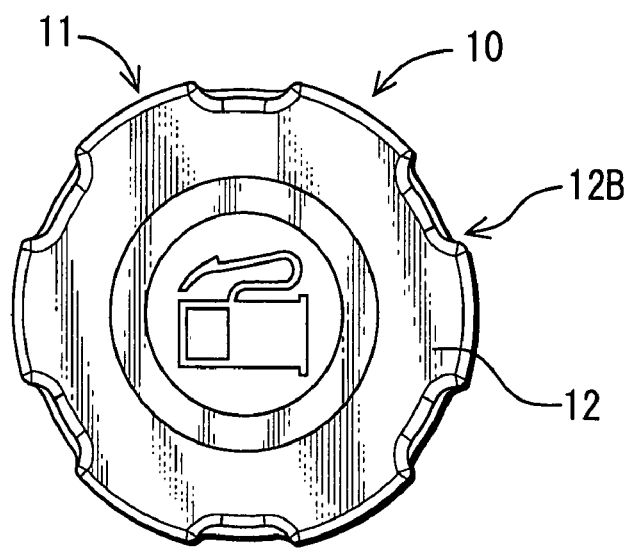
FIG. 2 is a plan view of the filler cap of the fuel tank according to one embodiment of the present invention.
Figure 3:
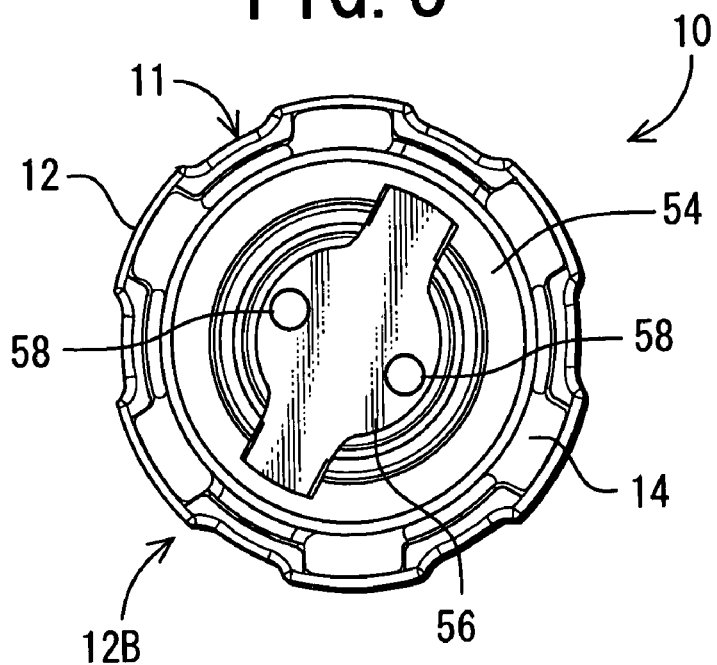
FIG. 3 is a back view of the filler cap of the fuel tank of FIG. 2.

As shown in FIGS. 2 and 3, the filler cap 10 is molded of a synthetic resin into a predetermined shape, and constituted of a cap main body 11 including a container-like outer lid 12 provided with a concave and convex portion 12B to be manually turned at an outer peripheral surface of the lid and an inner lid 14 attached to this outer lid 12 on an inner side. As shown in the inner lid 14 of FIG. 4, a hollow tube main body 16 is substantially positioned at the center and vertically disposed on an inner surface of the inner lid 14. As shown in FIG. 5, the cylindrical main body 16 is provided with a cylindrical tube-like portion 18 extended on one side (the left side in the drawing), and a reduced diameter portion 20 is formed continuously from this tube-like portion 18 on the other side of the main body (the right side in the drawing).

The tube-like portion 18 is formed so that a float 32 and a piston 40 described later can be inserted into the tube-like portion. Moreover, the reduced diameter portion is formed into a conical shape whose diameter decreases as the reduced diameter portion comes apart from the tube-like portion 18. The reduced diameter portion 20 is provided with an insertion hole 22 on a side away from the tube-like portion 18. This insertion hole 22 is formed in a small diameter (about ⅓ (unit: mm) of a diameter of a spherical member 30 described alter), and allows the inside of the tube main body 16 to communicate with the outside. The surface of the inner lid 14 on the side of the insertion hole 22 is provided with a plurality of (two in the embodiment) annular protrusions 23 formed into an annular shape having a predetermined width and a predetermined height in a radial direction centering on the insertion hole 22 (as shown in FIGS. 4, 5). Each annular protrusion 23 is provided with a plurality of recessed grooves 24 constituting a part of an air passage 26, six grooves 24 are substantially arranged at an equal interval in a circumferential direction centering on the insertion hole 22. The grooves are formed so that the central groove has a small width and so that the outer groove has a large width. It is to be noted that the air passage 26 will be described later in detail.

Figure 6:
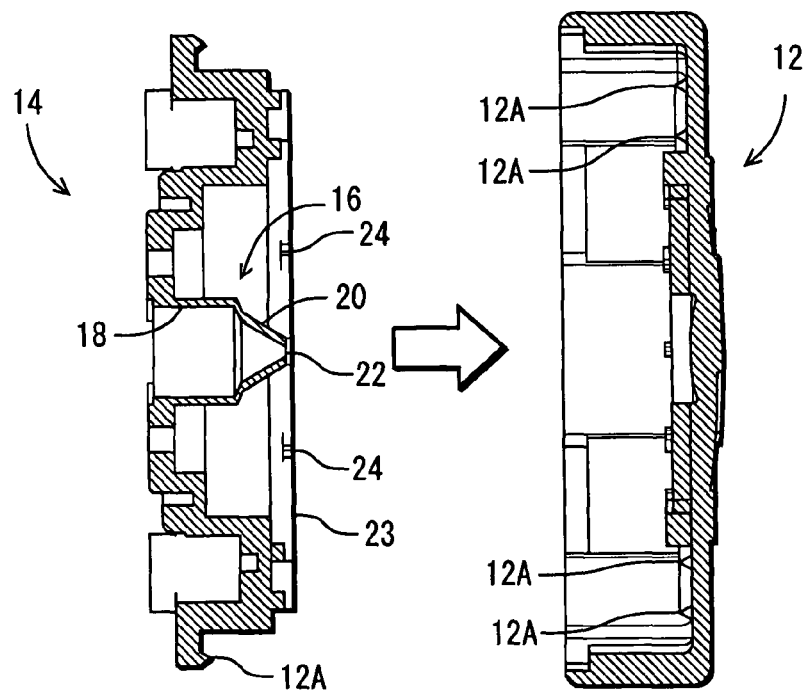
FIG. 6 is an assembly diagram of an outer lid and the inner lid constituting the filler cap of the fuel tank according to the present invention.
Figure 8:
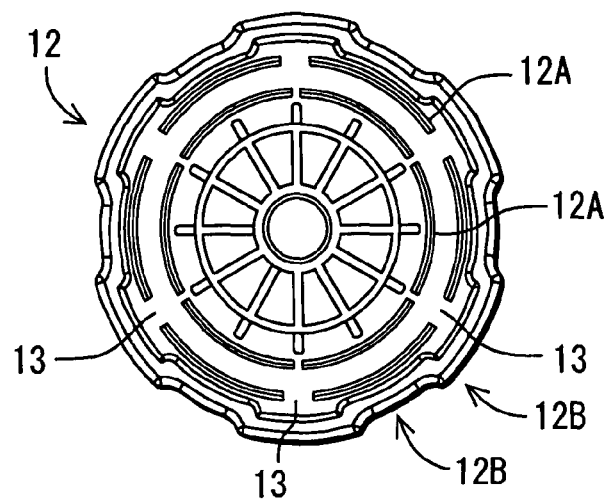
FIG. 8 is a back view of the outer lid constituting the filler cap of the fuel tank according to the present invention.

Moreover, as shown by a white arrow in FIG. 6, the inner lid 14 is inserted into the outer lid 12 from the side of the annular protrusions 23, and the inner lid 14 is welded and fixed to the outer lid 12 with an ultrasonic wave. That is, the outer lid 12 is provided with a plurality of annular ultrasonic ribs 12A which slightly protrude toward the inner lid 14, and these ultrasonic ribs 12A are welded and fixed to the annular protrusions 23 of the inner lid 14 with the ultrasonic wave. In consequence, the inner lid 14 is firmly fixed to the outer lid 12. The waveform-like concave and convex portion 12B is formed at a periphery of the outer lid 12. When the inner lid 14 is inserted into the outer lid 12, the concave and convex portion 12B disposed at the periphery of the outer lid 12 (the periphery crosses the tube main body 16 at right angles) forms a gap 13 between the outer lid 12 and the inner lid 14 (as shown in FIG. 8). It is to be noted that the ultrasonic rib 12A is also disposed at the inner lid 14.

Moreover, the plurality of ultrasonic ribs 12A disposed at the outer lid 12 are not disposed at a position facing a groove 24 portion disposed at each annular protrusion 23 of the inner lid 14. In consequence, it is constituted that, in a case where the outer lid 12 and the inner lid 14 are welded and fixed with the ultrasonic wave, the groove 24 (the air passage 26 between the outer lid 12 and the inner lid 14 described later) disposed at each annular protrusion 23 is not blocked by the ultrasonic rib 12A. It is to be noted that assembling of the cap main body 11 will be described later in detail.

Figure 7:
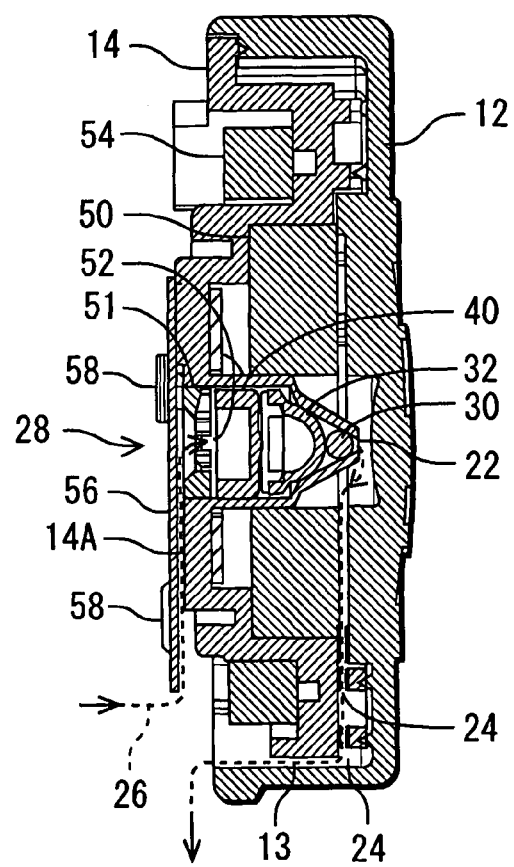
FIG. 7 is a longitudinal side view of the filler cap of the fuel tank of the present invention.
Figure 9:
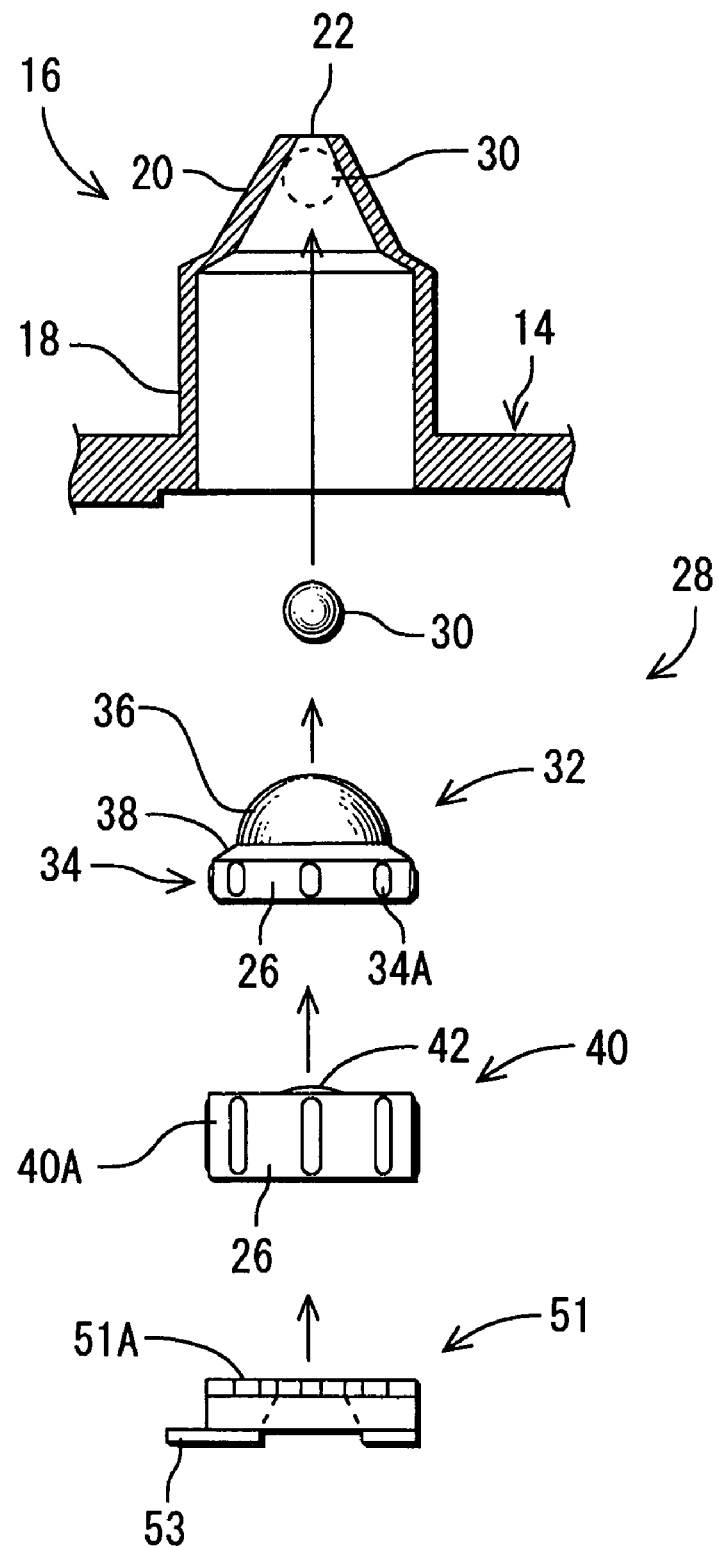
FIG. 9 is an assembly diagram of a main part (a valve mechanism portion constituted in an air passage) of the filler cap of the fuel tank according to the present invention.

As shown in FIG. 7, a valve (a valve mechanism portion 28) is disposed at the filler cap 10. That is, in the filler cap 10 (the cap main body 11), the valve mechanism portion 28 including the air passage 26 is disposed. The air passage allows the fuel tank 94 to communicate with the outside. As shown in FIG. 9, this valve mechanism portion 28 includes the tube main body 16, the spherical member 30 disposed at this tube-like portion 18, the float 32, the piston 40 and a base plate 51. That is, in the valve mechanism portion 28, the air passage 26 (a dotted line of FIG. 7) formed at the tube main body 16 is closed and opened with the spherical member 30. The spherical member 30 is formed of a metal such as stainless steel (SUS304) which hardly rusts and which has a specific gravity larger than that of the fuel, formed into, for example, a spherical shape having a diameter of about 2.5 mm, positioned at the float 32 externally from the fuel tank 94 and stored in the tube main body 16. It is to be noted that FIG. 9 shows the tube main body 16 in a vertically sectional view, and shows other components in a front view.

This spherical member 30 is formed so that the diameter of the member is a predetermined dimension larger than that of the insertion hole 22 disposed at the reduced diameter portion 20. Since the spherical member 30 is made of a metal, a predetermined weight is imparted to the member. It is thus constituted that the spherical member does not float owing to a pressure of a gas evaporated from the fuel stored in the fuel tank 94. The float 32 and the piston 40 are formed of a synthetic resin (e.g., nylon 6 or nylon 6, 6) which never rusts and which is not deformed or dissolved by the fuel.

Moreover, the float 32 includes a semispherical portion 36 having a hollow semispherical shape and a bottomed cylindrical tube portion 34 disposed on the other side of this semispherical portion 36 (a lower side in the drawing). Since the tube portion 34 on the other side (the lower side in the drawing) is formed into a flat surface and a predetermined space is formed between an outer peripheral surface of the tube portion and an inner surface of the tube-like portion 18, the tube portion can be stored in the tube-like portion 18. Moreover, the semispherical portion 36 is formed to have a diameter slightly smaller than an outer diameter of the tube portion 34. Between this tube portion 34 and the semispherical portion 36, a slant portion 38 is formed so that a diameter of the slant portion decreases from a tube portion 34 side toward the semispherical portion 36. Moreover, a predetermined space is formed between the outer diameter of the tube portion 34 and the inner surface of the tube-like portion 18.

Moreover, the inside of the float 32 is formed to be hollow in a state in which the semispherical portion 36, the slant portion 38 and the tube portion 34 are integrally formed. Moreover, it is constituted that the float can reciprocate in parallel between one side and the other side in the longitudinal direction of the tube-like portion 18. Since the inside of this float 32 is formed to be hollow, the specific gravity is reduced as compared with the fuel. Moreover, it is constituted that the float floats in the fuel. The semispherical portion 36 of the float 32 is formed into such a shape as to come in contact with the inside of the reduced diameter portion 20 in a case where the float 32 is moved toward the insertion hole 22.

Furthermore, the tube portion 34 of the float 32 is provided with a plurality of tube ribs 34A which extend in the longitudinal direction of the tube-like portion 18 (a direction from a piston 40 side to the insertion hole 22). The tube ribs 34A are formed into a width of about 1.0 mm and a thickness of about 0.2 mm. Eight tube ribs 34A are substantially disposed at an equal interval at a periphery of the tube portion 34, and formed into a hog-backed sectional shape. In consequence, the tube portion 34 inserted into the tube-like portion 18 comes in linear contact with the inner surface of the tube-like portion 18 to reduce a contact resistance. Moreover, a predetermined space is formed between the periphery of the tube portion 34 and the inner surface of the tube-like portion 18.

In a case where the tube ribs 34A at the periphery of the tube portion 34 come in contact with the inner surface of the tube-like portion 18, a predetermined space (a passage of air) is secured between the tube portion 34 disposed at a portion where any tube rib 34A is not disposed and the inner surface of the tube-like portion 18. That is, a space between the tube ribs 34A constitutes a part of the air passage 26. The air passage 26 around the tube portion 34 is formed of such a gap that, while the fuel stored in the fuel tank 94 flows through the tube-like portion 18, the fuel entering the insertion hole 22 is reduced.

The air passage 26 around the tube portion 34 is constituted of such a minimum gap that the tube portion 34 does not float owing to the pressure of the gas evaporated from the fuel stored in the fuel tank 94 and that the gas which has entered the tube-like portion 18 can smoothly pass toward the insertion hole 22. In a state in which the spherical member 30 and the float 32 are moved toward the insertion hole 22, the spherical member 30 and the semispherical portion 36 of the float 32 come in contact with the slant portion 38 to close the air passage 26.

On the other hand, the piston 40 is formed into a bottomed cylindrical shape having a length of about 3.7 mm and a diameter of about 9.6 mm. This piston 40 is formed into a container-like shape in which one side of the cylindrical shape is opened. Moreover, a predetermined gap is formed between an outer diameter of the piston and an inner diameter of the tube main body 16 (the tube-like portion 18). That is, the outer diameter of the piston 40 is formed to be smaller than the inner diameter of the tube main body 16, and it is constituted that the piston can be inserted into the tube-like portion 18.

On one side of the piston 40 (an upper side in the drawing), a protrusion 42 which protrudes to constitute a part of a spherical shape is disposed, and this protrusion 42 is constituted so that the piston 40 comes in point contact with a lower surface of the float 32. That is, since the piston 40 is provided with the protrusion 42 on one side, a tilt angle of the float 32 is not regulated even in a case where this protrusion 42 presses the float 32 on the other side (a lower side in FIG. 9). In consequence, it is possible to prevent a disadvantage that the float 32 is caught by the inner surface of the tube-like portion 18 and an operation of the float 32 is slowed.

Specifically, the piston 40 is provided with the protrusion 42 protruding toward the float 32 on one side thereof, and the surface of this protrusion 42 on an opposite side is formed into a cylindrical opened and bottomed container shape. In this state, the piston 40 is constituted to be movable in parallel in the longitudinal direction in the tube-like portion 18. Moreover, this protrusion 42 prevents the piston 40 and the float 32 from being adsorbed with the fuel. The protrusion 42 of the piston 40 is formed so as to substantially come in contact with the center of the float 32. In consequence, in a case where the float 32 and the piston 40 slightly tilt in the tube-like portion 18 (e.g., at a tilt angle of ½₀ to ⅕₀ of a length of the piston 40), degrees of freedom of the piston 40 and the float 32 are secured.

Figure 10:
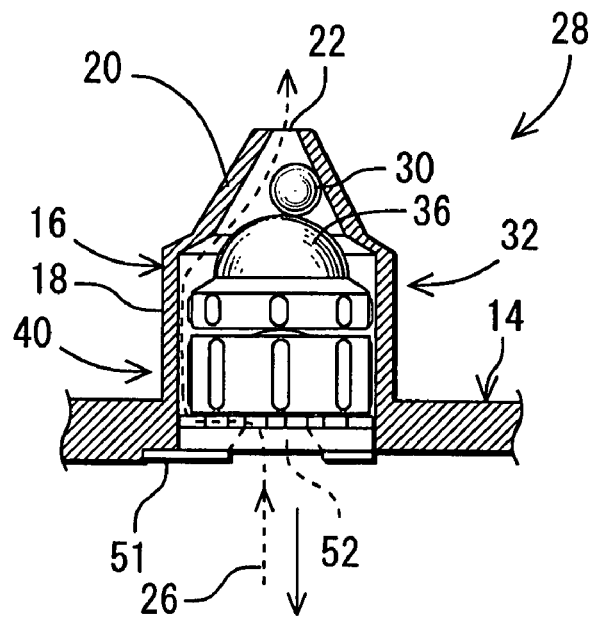
FIG. 10 is an enlarged view of a valve mechanism portion showing an air passage at a time when the inside of the fuel tank communicates with the outside.
Figure 11:
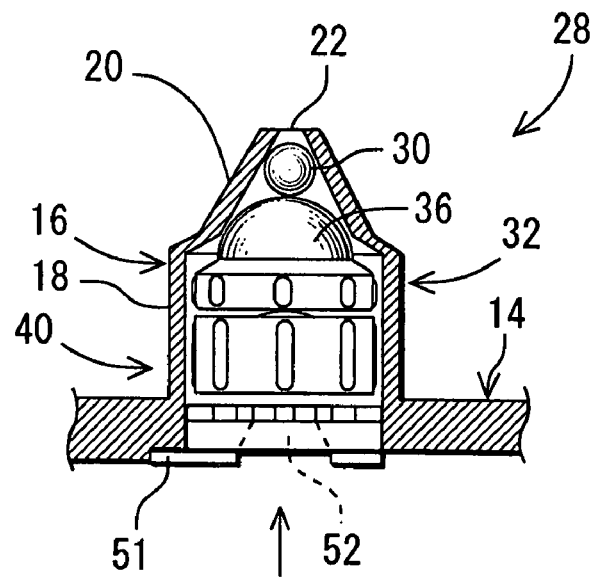
FIG. 11 is an enlarged view of the valve mechanism portion showing the air passage at a time when the fuel tank is closed.

Moreover, when a valve of the valve mechanism portion 28 closes (in a state in which the spherical member 30 abuts on the float 32), the spherical member 30 is substantially positioned at a vertex of the center of the semispherical portion 36 (shown in FIG. 11). When the valve opens, the spherical member 30 deviates from the vertex of the center of the semispherical portion 36 to drop down toward the tube portion 34 (shown in FIG. 10). In this case, since the semispherical portion 36 of the float 32 is formed into a semispherical shape, the spherical member 30 drops down from the vertex of the semispherical portion 36 (from the side of the insertion hole 22) in either direction (on the side of the tube portion 34). In this case, the spherical member 30 is pressed toward the insertion hole 22 at the vertex of the semispherical portion 36. In consequence, a distance between the insertion hole 22 and the spherical member 30 at a time when the spherical member 30 drops down from the semispherical portion 36 in either direction can be set to be larger than that between the spherical member 30 and the insertion hole 22 at a time when the spherical member 30 is positioned at the vertex of the semispherical portion 36 (the spherical member 30 is positioned closest to the insertion hole 22).

That is, since the semispherical portion 36 of the float 32 is formed into the semispherical shape and the spherical member 30 is allowed to drop down from the semispherical portion 36 in either direction, the gap between the inner surface of the reduced diameter portion 20 and the spherical member 30 can be enlarged with a small movement distance of the float 32. In consequence, resistance of air circulated through the air passage 26 of the valve mechanism portion 28 can be reduced. Therefore, it is prevented that the spherical member 30 rises owing to the pressure of the gas evaporated from the fuel stored in the fuel tank 94 and that the insertion hole 22 is closed (the spherical member 30 comes in contact with the inner surface of the reduced diameter portion 20).

Moreover, in order to reduce the resistance to raise the float 32 (resistance to press the spherical member 30 onto the inner surface of the reduced diameter portion 20), the float is supported by the linear contact and the point contact of three points including a point between the reduced diameter portion 20 and the semispherical portion 36 of the float 32, between the inner surface of the tube-like portion 18 and the tube portion 34 of the float 32 and between the float and the protrusion 42 of the piston 40. The linear and point contacts prevent a disadvantage that the float 32 is adsorbed with the fuel which has entered the valve mechanism portion 28 to cause an operation defect. The protrusion 42 is formed at the piston 40 to impart the degree of freedom to the float 32. In consequence, the contact resistance is reduced owing to the degree of freedom of the float 32 at a time when the piston 40 is pushed upwards. Therefore, when the spherical member 30 is momentarily pressed onto the inner surface of the reduced diameter portion 20 in cooperation with the rising of the piston 40, the air passage 26 of the reduced diameter portion 20 can be closed.

Furthermore, an outer periphery of the tube portion 34 is provided with the tube ribs 34A which come in contact with the inner surface of the tube-like portion 18. The tube ribs 34A are formed into such a thickness that the tube rib comes in linear contact with the inner surface of the tube-like portion 18 and that the tube ribs 34A do not cause surface adsorption with respect to the inner surface of the tube-like portion 18 owing to the fuel, and a part of the air passage 26 is constituted between the tube ribs 34A. Moreover, this air passage 26 is formed into such a size that the gas easily passes so that the float 32 does not float owing to the pressure of the gas evaporated from the fuel stored in the fuel tank 94. The resistance of the float 32 against the inner surface of the tube-like portion 18 at a time when the float drops down can be reduced at the tube ribs 34A. Therefore, even when the float moves (drops down) toward the fuel tank 94, the float can smoothly be operated. It is to be noted that, when the fuel tank 94 tilts up to 45 degrees, buoyancy of the float 32 also functions as a pressure for pressing the spherical member 30 onto the inner surface of the reduced diameter portion 20.

In addition, the piston 40 is provided with vertical ribs 40A which extend in the longitudinal direction of the tube-like portion 18. Each of the vertical ribs 40A is formed into a width of about 1.0 mm and a thickness of about 0.2 mm. Eight vertical ribs are substantially arranged at an equal interval at the periphery of the piston 40, and each vertical rib is formed into a hog-backed sectional shape. In consequence, the piston 40 inserted into the tube-like portion 18 is brought into linear contact with the inner surface of the tube-like portion 18 to reduce the contact resistance. Moreover, a predetermined gap is formed between the periphery of the piston 40 and the inner surface of the tube-like portion 18. A part of the air passage 26 is constituted between these vertical ribs 40A.

That is, in a case where the vertical ribs 40A disposed at the periphery of the piston 40 come in contact with the inner surface of the tube-like portion 18, a predetermined gap is secured between the periphery of the piston 40 at a position where any vertical ribs 40A is not disposed and the inner surface of the tube-like portion 18. In consequence, the piston 40 can smoothly move in the tube-like portion 18. The vertical ribs 40A are formed into such a thickness as to reduce the fuel which enters the tube-like portion 18 from the fuel tank 94 and which passes between the periphery of the piston 40 and the tube-like portion 18 to flow toward the float 32. The vertical ribs 40A are formed into such a minimum gap thickness that the piston 40 does not float owing to the pressure of the gas which is evaporated from the fuel stored in the fuel tank 94 to enter the tube-like portion 18 and that the gas which has entered the tube-like portion 18 is smoothly passed toward the insertion hole 22.

Figure 12:
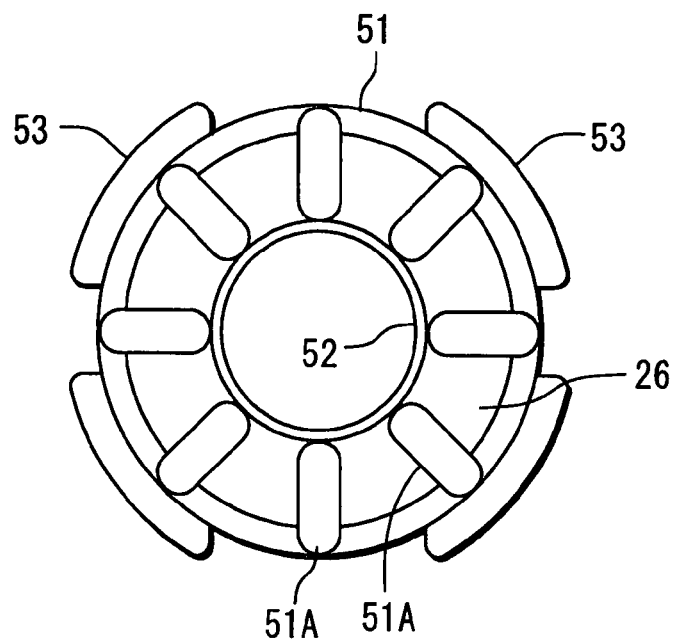
FIG. 12 is a front view of a base plate constituting the filler cap of the fuel tank according to the present invention.

Moreover, as shown in FIG. 12, the base plate 51 is made of a synthetic resin (nylon 6 or nylon 6, 6) which never rusts and which is not deformed or dissolved by the fuel. The base plate 51 is fixed to the inner lid 14 by a spring 56 described later. The base plate 51 is formed into, for example, a disc-like shape having a diameter of about 10.2 mm and a thickness of 1.6 mm, a through hole 52 having a diameter of about 4.5 mm is disposed so as to extend through the center of the plate, and this through hole 52 communicates with the inside of the fuel tank 94.

A diameter of the through hole 52 is set to be smaller than an outer diameter of the base plate 51. In consequence, the hole is constituted so that, when the fuel flows through the through hole 52, the fuel can be jetted to a lower part of the piston 40. That is, the piston 40 can be moved toward the float 32 owing to a pressure of the fuel jetted from the through hole 52 (hereinafter referred to as the jetting pressure). One surface of the base plate 51 (the surface on the side of the float 32) is provided with horizontal ribs 51A each having a width of about 1.0 mm and a thickness of about 0.8 mm, and a plurality of (eight in the embodiment) of horizontal ribs 51A are arranged at an equal interval in a circumferential direction of the through hole 52.

The horizontal ribs 51A are arranged radially from the center thereof, and formed into a hog-backed sectional shape. The horizontal ribs 51A come in linear contact with the piston 40 to prevent the base plate 51 and the piston 40 from being adsorbed. The through hole 52 of the base plate 51 communicates between the piston 40 and the tube-like portion 18 via portions between the horizontal ribs 51A. In consequence, the fuel and the gas evaporated from the fuel can flow through the through hole 52 to enter the piston 40 on the other side (the lower part of the piston 40). It is to be noted that the portion between the horizontal ribs 51A constitutes a part of the air passage 26.

Figure 13:
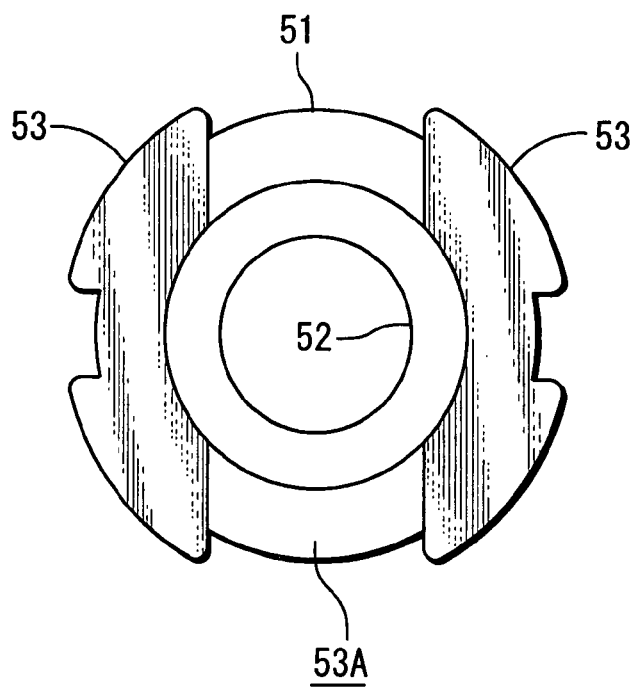
FIG. 13 is a back view of the base plate constituting the filler cap of the fuel tank according to the present invention.

Moreover, the other surface of the base plate 51 is provided with engagement pieces 53 having a thickness of about 0.6 mm and a diameter of about 11.7 mm, and the engagement pieces 53 are formed so as to face each other on opposite sides of the through hole 52 (shown in FIG. 13). The base plate 51 is formed so that the plate can come in close contact with the inner surface of the tube-like portion 18. Moreover, the engagement pieces 53 are engaged with the tube-like portion 18. In consequence, the base plate 51 is inhibited from moving toward the insertion hole 22. A concave portion 53A recessed to reach the base plate 51 is formed between both the engagement pieces 53, and the through hole 52 and the concave portion 53A constitute a part of the air passage 26.

Here, in the car 100, the tilt angle of the fuel tank 94 is set to about 30 degrees or less. Moreover, when the fuel tank 94 tilts, the fuel stored in the fuel tank 94 reaches the filler cap 10. At this time, when the fuel reaches the filler cap 10, the fuel flows through the through hole 52 disposed at the center of the base plate 51, enters the valve mechanism portion 28, and is rapidly jetted from the through hole 52 (on the side of the piston 40), depending on an amount of the fuel of the fuel tank 94 and the tilt angle of the fuel tank 94. When the fuel is jetted into the piston 40 formed into a container-like shape, the piston 40 is pushed upwards toward the spherical member 30 owing to the jetting pressure of the fuel, and the float 32 and the spherical member 30 rise (move toward the insertion hole 22 in this case) in cooperation with the piston 40. It is to be noted that the through hole 52 is formed into such a size that the fuel can be jetted in a case where the fuel enters the valve mechanism portion 28.

Moreover, when the fuel tank 94 is horizontally disposed, the fuel is sucked into the fuel tank 94 to generate a negative pressure in the tube main body 16. In this case, the piston 40 drops down onto the base plate 51 (onto the horizontal ribs 51A) owing to a function of a suction force in a case where the fuel returns from the tube main body 16 to the fuel tank 94 and weights of the spherical member 30, the piston 40 and the float 32 (it is assumed that this state is a stroke lower limit of the piston 40). At this time, the fuel which has entered the valve mechanism portion 28 returns into the fuel tank 94 from the gap (the air passage 26) between the horizontal ribs 51A, and the air passage 26 of the valve mechanism portion 28 is secured to allow atmospheric air to enter the fuel tank 94. In consequence, the inside of the fuel tank 94 is retained at an atmospheric pressure.

Next, the assembling of the filler cap 10 constituted as described above will be described. It is to be noted that the inner lid 14 is inserted into the outer lid 12 from the side of the annular protrusions 23. It is also assumed that the inner lid 14 and the outer lid 12 are welded and fixed with the ultrasonic wave beforehand. First, a filter 50 (shown in FIG. 7) formed of an elastic member (e.g., sponge) is inserted around the tube main body 16, and a gasket 54 is disposed on the filter (on the side of the fuel tank 94). Next, the spherical member 30, the float 32 and the piston 40 are inserted into the tube main body 16 in order from the side of the insertion hole 22 of the reduced diameter portion 20 (a solid-line arrow of FIG. 9). In this state, the spherical member 30 comes in contact with the semispherical portion 36 of the float 32, and the bottom surface of the tube portion 34 of the float 32 comes in contact with the protrusion 42 of the piston 40.

Subsequently, the base plate 51 and the spring 56 are mounted on the piston 40 in order (on an opposite side of the float 32). Moreover, the inner lid 14 and the spring 56 are caulked and fixed via rivets 58 (shown in FIG. 7). The inner lid 14 and the spring 56 are provided with fixing holes 57 through which the rivets 58 are inserted to fix the rivets (shown in FIG. 4). In consequence, the assembling of the filler cap 10 is completed. It is to be noted that the filler cap 10 (the cap main body 11) is fixed to the fuel inlet 95 of the fuel tank via the spring 56.

Moreover, when the cap main body 11 is attached to the fuel inlet 95 of the fuel tank, the gasket 54 abuts on the fuel inlet 95 of the fuel tank. In consequence, the fuel inlet 95 of the fuel tank is closed with the cap main body 11. An air passing gap 14A (shown in FIG. 7) having a predetermined dimension is formed between this inner lid 14 and the spring 56, and this air passing gap 14A forms the air passage 26 between the inner lid 14 and the spring 56. This air passing gap 14A communicates with the through hole 52 via the concave portion 53A of the base plate 51. In consequence, the cap main body 11 is provided with the air passage 26 (a dotted-line arrow of FIG. 7) which allows the inside of the fuel tank 94 to communicate with the outside (the outside corresponds to the atmosphere in this case).

Here, the air passage 26 will be described in detail. It is to be noted that the air passage 26 is shown by a dotted-line arrow of FIG. 7 and a dotted-line arrow of FIG. 10. In the air passage 26, in a usual use state in which the fuel tank 94 tilts little, the spherical member 30 is positioned downwards (on the side of the fuel tank 94) owing to the gravity in a case where the piston 40 is positioned away from the insertion hole 22 (on the side of the fuel tank 94). It is to be noted that the usual use state of the car 100 is, for example, a state in which the fuel tank 94 is positioned in a horizontal state or tilts at 30 degrees or less. FIG. 10 shows the tube main body 16 in a vertically sectional view, and other components in a front view.

Moreover, the semispherical portion 36 of the float 32 and the piston 40 are positioned downwards owing to the gravity. It is to be noted that a distance between the semispherical portion 36 of the float 32 and the insertion hole 22 of the reduced diameter portion 20 is about ⅓ or less of the diameter of the spherical member 30 in terms of the shortest distance between the reduced diameter portion 20 and the semispherical portion 36 of the float 32. In consequence, it is prevented that the spherical member 30 which has dropped down is nipped between the reduced diameter portion 20 and the float 32 (the semispherical portion 36) and that the spherical member 30 does not move toward the insertion hole 22.

The air passage 26 extends through the through hole 52 disposed at the center of the base plate 51 from the fuel tank 94 to reach the lower part of the piston 40. Subsequently, the passage extends from the lower part of the piston 40, and extends between the inner surface of the tube-like portion 18 and the vertical ribs 40A of the piston 40 to reach a lower part of the float 32. Subsequently, the passage passes from the lower part of the float 32, and passes between the inner surface of the tube-like portion 18 and the tube ribs 34A of the float 32 to reach the inside of the reduced diameter portion 20. Furthermore, the passage passes between the inner surface of the reduced diameter portion 20 and the spherical member 30 to communicate with the outside through the insertion hole 22. That is, in the valve mechanism portion 28, when the valve is opened, the inside of the fuel tank 94 communicates with the outside via the air passage 26. In other words, in the usual use state of the car 100, the valve is opened, and the inside of the fuel tank 94 communicates with the outside via the air passage 26.

On the other hand, when the fuel inlet 95 of the fuel tank is closed with the filler cap 10 and the fuel stored in the fuel tank 94 is consumed, outside air corresponding to a volume of the consumed fuel is sucked into the fuel tank 94 from the air passage 26. In consequence, a disadvantage is prevented that a negative pressure is obtained in the fuel tank 94 and that the fuel cannot be sucked during an operation of the engine 90. When the fuel of the fuel tank 94 is not consumed, the gas evaporated from the fuel stored in the fuel tank 94 is discharged from the air passage 26 disposed at the cap main body 11 to prevent a disadvantage that a high pressure is obtained in the fuel tank 94.

Furthermore, as shown in FIG. 11, when the piston 40 is positioned on the side of the insertion hole 22 (on the side opposite to the fuel tank 94), the spherical member 30 moves upwards (an arrow direction in the drawing) to come in linear contact with the inside of the reduced diameter portion 20. At this time, the spherical member 30 comes in point contact with the semispherical portion 36 of the float 32. Moreover, both of the spherical member 30 and the semispherical portion 36 of the float 32 come in linear contact with the slant portion 38. When these components come in contact with each other, the valve mechanism portion 28 is closed, and the air passage 26 which allows the inside of the fuel tank 94 to communicate with the outside is closed. It is to be noted that FIG. 11 shows the tube main body 16 in a vertically sectional view, and other components in a front view.

In addition, when the fuel tank 94 tilts or vibrates, the fuel stored in the fuel tank 94 reaches the fuel inlet 95 of the fuel tank, enters the cap main body 11 and enters the tube main body 16 in some case. In a case where the fuel tank 94 tilts or vibrates until a fuel liquid surface of the fuel tank 94 reaches or exceeds an inlet of the air passage 26 at the bottom surface of the filler cap 10, the fuel of the fuel tank 94 enters the tube main body 16 from the through hole 52 of the base plate 51. Moreover, the piston 40 of the valve mechanism portion 28 moves toward the insertion hole 22 owing to the jetting pressure of the fuel which has flowed from the through hole 52. Moreover, the float 32 floats to move toward the insertion hole 22 owing to the fuel which has entered the tube main body 16.

Moreover, when the float 32 moves toward the insertion hole 22, the spherical member 30 also moves toward the insertion hole 22 owing to the semispherical portion 36. In this case, since the fuel enters the tube main body 16, the piston 40 moves toward the insertion hole 22 together with the float 32 and the spherical member 30 in a short time. In consequence, the semispherical portion 36 of the float 32 and the spherical member 30 momentarily and simultaneously come in contact with the slant portion 38 to close the air passage 26 which allows the inside of the fuel tank 94 to communicate with the outside.

Specifically, when the fuel tank 94 tilts or vibrates and the liquid surface of the fuel of the fuel tank 94 comes above the air passage 26 disposed at the bottom portion of the cap main body 11, the fuel enters the valve mechanism portion 28. Moreover, when the fuel enters the valve mechanism portion 28, owing to the jetting pressure generated at a time when the fuel flows through the through hole 52, the piston 40, the float 32 and the spherical member 30 cooperate to move toward the insertion hole 22. The spherical member 30 is then pressed onto the inner surface of the reduced diameter portion 20 (a stroke upper limit), the air passage 26 disposed at the cap main body 11 is closed, and the fuel stored in the fuel tank 94 is prevented from flowing out of the filler cap 10.

Moreover, when the tilted fuel tank 94 returns to be horizontal, the fuel which has entered the valve mechanism portion 28 is sucked owing to the gravity to return into the fuel tank 94. When the fuel of the valve mechanism portion 28 returns into the fuel tank 94, the piston 40, the float 32 and the spherical member 30 move toward the base plate 51 owing to the suction of the fuel and the weights of these components, and the air passage 26 of the reduced diameter portion 20 closed with the spherical member 30 is opened (the valve is opened). In consequence, since the inside of the fuel tank 94 communicates with the outside via the air passage 26, the inside of the fuel tank 94 can be retained at the atmospheric pressure.

That is, in the valve mechanism portion 28, when the semispherical portion 36 of the float 32 comes in linear contact with the reduced diameter portion 20 prior to the spherical member 30, the spherical member 30 cannot securely be pressed onto the inner surface of the reduced diameter portion 20. To solve the problem, a slight gap is disposed between the semispherical portion 36 and the reduced diameter portion 20 in a state in which the spherical member 30 is securely pressed onto the inner surface of the reduced diameter portion 20. In consequence, an amount of the fuel to be passed through this gap is reduced, the resistance is increased and invasion of the fuel toward the spherical member 30 is delayed. Therefore, the air passage 26 formed in the reduced diameter portion 20 by the spherical member 30 can securely be closed. It is to be noted that the spherical member 30 and the semispherical portion 36 of the float 32 both have a spherical shape. In a case where the spherical member 30 and the semispherical portion 36 of the float 32 come in contact with the conical slant portion 38, the inner surface of the slant portion 38, the inner surface of the slant portion 38 comes in linear contact with the periphery of the spherical member 30 and the periphery of the semispherical portion 36 of the float 32. This hinders a disadvantage that the spherical member 30 and the semispherical portion 36 of the float 32 are adsorbed by the inner surface of the slant portion 38 by the fuel.

Moreover, when the fuel tank 94 tilts, the liquid surface of the fuel stored in the fuel tank 94 rises to or above the bottom of the filler cap 10. When the liquid surface of the fuel rises to the bottom of the filler cap 10, owing to the liquid pressure of the fuel (a weight of the fuel which has risen above the filler cap 10), the fuel flows through the air passage 26 disposed at the bottom surface of the cap main body 11, and is jetted into (enters) the tube main body 16 from the through hole 52 disposed at the center of the base plate 51. When the fuel is jetted into the tube main body 16, the piston 40 is pushed upwards (toward the insertion hole 22) by the jetting pressure of the fuel, and the float 32 positioned above the piston 40 is also pushed upwards.

When the float 32 is pushed upwards, the spherical member 30 positioned on the semispherical portion 36 of the float 32 is also pushed up toward the insertion hole 22. In consequence, the semispherical portion 36 of the float 32 is pressed onto the inner wall of the reduced diameter portion 20. Moreover, the spherical member 30 is pressed onto the insertion hole 22 disposed above the reduced diameter portion 20. That is, the spherical member 30 disposed at the valve mechanism portion 28 operates as a rollover valve 96 (a valve to prevent the fuel from leaking to the outside, only when the fuel tank 94 of a conventional example tilts), and prevents the fuel of the fuel tank 94 from flowing to the outside thorough the air passage 26 of the cap main body 11 from the insertion hole 22 disposed at the tip end of the tube main body 16. It is to be noted that FIG. 1 also shows a diagram in which the conventional fuel tank 94, the rollover valve 96, a canister 98 and a vaporizer 92 are successively connected via a piping line.

On the other hand, the fuel stored in the fuel tank 94 enters the lower surface of the piston 40 from the lower surface of the piston 40, that is, the through hole 52 at the center of the base plate 51. At this time, the piston 40 rises owing to the jetting pressure of the fuel which has entered the tube main body 16 from the insertion hole in a time shorter than a time when the fuel flows through the gap between the tube-like portion 18 and the piston 40 to reach the float 32. In consequence, the piston 40, the float 32 and the spherical member 30 substantially simultaneously rise in cooperation with one another. The air passage 26 formed in the reduced diameter portion 20 is closed with the spherical member 30 faster than the fuel which reaches the insertion hole 22. In consequence, the fuel is prevented from leaking out of the insertion hole 22.

Moreover, since the fuel flows through the gap between the tube-like portion 18 and the piston 40 to enter the float 32, the buoyancy of the float 32 functions as the pressure to press the spherical member 30 onto the inner surface of the reduced diameter portion 20 until the tilt angle of the fuel tank 94 increases to about 45 degrees. This securely prevents the fuel which has flowed through the insertion hole 22 from leaking out of the air passage 26. In a case where the fuel tank 94 tilts at about 45 to 90 degrees, the cap main body 11 is positioned below the liquid surface of the fuel. In consequence, the liquid surface of the fuel fed to the cap main body 11 also rises. Therefore, a liquid pressure to be applied to the piston 40 and the float 32 also increases. Therefore, the pressure to press the spherical member 30 onto the inner surface of the reduced diameter portion 20 also increases. Even if the buoyancy of the float 32 decreases, the spherical member 30 disposed at the valve mechanism portion 28 can function as the rollover valve 96 to prevent the fuel from flowing to the outside.

Here, the fuel tank 94 is tilted at 90 degrees to measure the leaking of the fuel from the air passage 26 of the valve mechanism portion 28 for ten minutes. Specifically, the filler cap 10 (the cap main body 11) was attached to the fuel tank 94 of the engine 90 (in this case, a natural dropdown type fuel supply machine in which the engine 90 and the fuel tank 94 are integrated), the fuel tank 94 was tilted at 90 degrees, and the fuel leakage from the air passage 26 disposed at the cap main body 11 was measured. As a result, in a case where the fuel tank 94 containing a defined maximum amount of the fuel was tilted at 90 degrees in a state in which a fuel cock was opened, after elapse of ten minutes, the amount of the fuel which had leaked from the air passage 26 of the filler cap 10 was 0.5 milliliter. From a conventional filler cap, the leakage of 117.7 milliliters of fuel was confirmed. That is, the conventional filler cap had the fuel leakage about 234 times as large as the filler cap 10 of the present invention. It is to be noted that, at this time, outside air temperature was 25° C.

Moreover, on the same conditions as the above-mentioned conditions, the fuel tank 94 was tilted to the left or the right ten times (at a tilt angle of 30 degrees on one side). After the fuel entered the valve mechanism portion 28 from the air passage 26 of the cap main body 11, the fuel tank 94 was tilted at 90 degrees and retained for one minute. At this time, a time required until the fuel leaked from the air passage 26 of the cap main body 11 and the leakage amount were measured. It has been found that the leakage amount of the filler cap 10 of the present invention was 0 milliliter and that the fuel leaked from the air passage 26 of the conventional filler cap 10 in two to four seconds (at this time, the leakage amount of the fuel was about 12 milliliters). The fuel tank 94 tilts owing to a use state of the fuel tank 94, the fuel stored in the tank waves owing to the vibration of the engine 90, and the fuel enters the air passage 26 of the cap main body 11. From this experiment result, the filler cap 10 of the present invention is remarkably effective against the fuel leakage from the air passage 26 of the cap main body 11 at a time when the fuel tank 94 tilts as compared with the conventional filler cap.

As described above, the air passage 26 which allows the inside of the fuel tank 94 to communicate with the outside and the valve mechanism portion 28 constituted in the air passage 26 are constituted in the cap main body 11. The valve mechanism portion 28 includes the tube main body 16 having the tube-like portion 18 and the reduced diameter portion 20 formed externally and continuously from the tube-like portion 18, the float 32 stored in the tube main body 16 with the space between the float and the inner surface of the tube main body 16, the piston 40 positioned in the fuel tank 94 of the float 32 and stored in the tube main body 16 with the space between the piston and the inner surface of the tube main body 16 and the spherical member 30 positioned outside the float 32 and stored in the tube main body 16. Moreover, when the fuel enters the tube main body 16, the piston 40 and the float 32 float on the outer side, and the spherical member 30 is pressed onto the reduced diameter portion 20 of the tube main body 16 by the float 32 to close the air passage 26. Therefore, for example, when the fuel tank 94 tilts and the fuel enters the tube main body 16, the air passage 26 can momentarily be closed with the spherical member 30.

This can prevent a disadvantage that the fuel stored in the fuel tank 94 flows from the air passage disposed at the filler cap as in the conventional technology. It is also possible to hinder in advance a danger that the fuel which has flowed out catches fire. It is also possible to prevent a disadvantage that plant is damaged by the fuel which has flowed from the air passage 26 disposed at the filler cap 10.

Especially, the valve mechanism portion 28 is disposed at the filler cap 10 without changing any appearance. Since the disadvantage that the fuel stored in the fuel tank 94 flows from the air passage 26 disposed at this valve mechanism portion 28 is prevented, it is possible to provide the inexpensive filler cap 10 having satisfactory appearance.

Moreover, in the car 100 to which the conventional filler cap is attached, the fuel tank 94 sometimes tilts, depending on the use conditions. When the fuel tank 94 tilts, the fuel sometimes leaks from the air passage 26 of the filler cap 10. However, since the filler cap 10 of the present invention is attached to the fuel inlet 95 of the fuel tank, the fuel can be prevented from leaking out of the air passage 26 disposed at the cap main body 11 at a time when the fuel tank 94 tilts. In consequence, safety can be secured, and the damage on the plant and air pollution can be suppressed.

Embodiment 2

Figure 14:
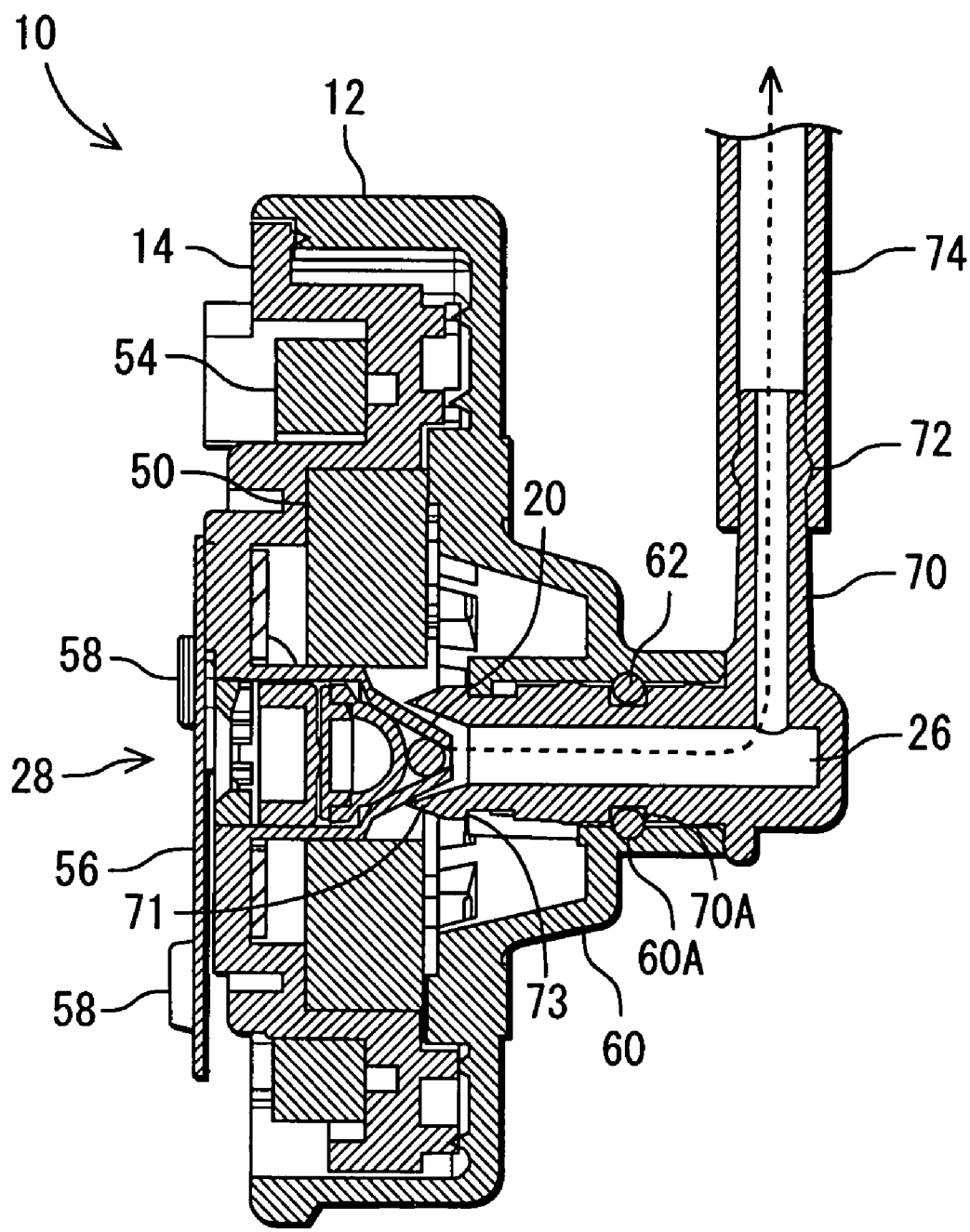
FIG. 14 is a longitudinal side view a filler cap of a fuel tank according to the present invention (in a state in which a pipe is attached to the center of an outer lid) (Embodiment 2)

Next, FIG. 14 shows a filler cap 10 of a fuel tank 94 according to another embodiment of the present invention. The filler cap 10 of the fuel tank 94 substantially has the same constitution as that of the above embodiment. Different parts will hereinafter be described. It is to be noted that the same parts as those of the above embodiment are denoted with the same reference numerals and description thereof is omitted. The embodiment is not provided with grooves 24 (an air passage 26) formed at annular protrusions 23 of an inner lid 14 according to Embodiment 1. That is, in Embodiment 2, it is constituted that a gas evaporated from fuel stored in the fuel tank 94 is not discharged from the filler cap 10.

In the filler cap 10 of the fuel tank 94, as shown in FIG. 14, an outer lid 12 constituting a cap main body 11 is provided with a pipe 70 having a cylindrical shape, substantially bent at right angles and having a hollow inner portion. This pipe 70 is constituted so that the fuel enters a vaporizer 92 via a canister 98 which adsorbs and removes the gas evaporated from the fuel stored in the fuel tank 94.

The outer lid 12 is provided with a pipe attaching portion 60 disposed continuously from the outer lid 12 and having a cylindrical hollow inner portion. This pipe attaching portion 60 is substantially disposed at the center of the outer lid 12, and extends as much as a predetermined dimension in a direction in which the pipe attaching portion comes away from the inner lid 14. An outer diameter of the pipe 70 on one side (the left side in the drawing) is formed to be smaller than an inner diameter of the pipe attaching portion 60 by a predetermined dimension, and the pipe is inserted into the pipe attaching portion 60. A tip end of the pipe 70 inserted in this pipe attaching portion 60 is positioned in the vicinity of an insertion hole 22 of a tube main body 16. Moreover, the insides of the pipe 70 and the pipe attaching portion 60 communicate with the air passage 26 formed at the cap main body 11.

Moreover, in a case where the pipe 70 is attached to the pipe attaching portion 60, an O-ring 62 made of an elastic fluorine rubber is attached to a gap between the pipe attaching portion 60 and the pipe 70. The O-ring 62 closes the gap between the pipe attaching portion 60 and the pipe 70. The gap between the pipe attaching portion 60 and the pipe 70 is closed with this O-ring 62 to thereby prevent the gas of the air passage 26 from leaking to the atmosphere from the gap between the pipe attaching portion 60 and the pipe 70.

Furthermore, as shown in FIG. 14, a groove 60A for the O-ring 62 is substantially disposed at the center of the pipe attaching portion 60 in a longitudinal direction. Moreover, on the one side of the pipe 70, a groove 70A for attaching the O-ring 62 is disposed so as to face the groove of the pipe attaching portion 60. This groove 70A is disposed so as to face the groove of the pipe attaching portion 60 in a state in which the pipe 70 is attached to the pipe attaching portion 60. Moreover, since the O-ring 62 is attached to the grooves disposed at the pipe attaching portion 60 and the pipe 70, a claw 73 disposed at the pipe 70 is engaged with the outer lid 12. In consequence, the pipe 70 is prevented from coming off the pipe attaching portion 60. Moreover, it is constituted that the pipe 70 can be rotated in a state in which the cap main body 11 is fixed. That is, the pipe 70 is rotatably attached to the cap main body 11. Moreover, the inside of the pipe 70 communicates with the inside of the air passage 26.

On a side opposite to the pipe attaching portion 60 which is one side of the pipe 70 (on an upper side in the drawing), a hose 74 made of a bendable elastic synthetic rubber, an elastic natural rubber or the like is detachably attached. The pipe 70 is provided with a come-off preventive portion 72 for preventing the hose 74 from coming off. This come-off preventive portion 72 is peripherally disposed in a predetermined width in the vicinity of one end portion of the pipe 70, and the come-off preventive portion protrudes at a predetermined height.

That is, the vicinity of the one end portion of the pipe 70 is formed in a predetermined width larger than a width of another portion. In consequence, the come-off preventive portion 72 is disposed. Therefore, a close contact property between the pipe 70 and the hose 74 is improved, and the pipe 70 is prevented from coming off the pipe 70. Moreover, one side (the upper side in the drawing) of the hose 74 is connected to the canister 98, the vaporizer 92 or the like, and the hose on the other side is longer than the come-off preventive portion 72 as much as a predetermined dimension, and inserted toward the cap main body 11. It is to be noted that, in a case where the filler cap 10 of the present invention is used, since any fuel does not flow outwards, any rollover valve 96 is not required. Moreover, an enlarged portion 71 which enlarges toward a tip end thereof is disposed at the pipe 70 on one side (the left side in the drawing). This enlarged portion 71 slidably comes in close contact with a reduced diameter portion 20 of the tube main body 16 at a predetermined pressure. When this enlarged portion 71 comes in close contact with the reduced diameter portion 20, the air passage 26 is prevented from communicating with the outside via a space between the enlarged portion 71 of the pipe 70 and the reduced diameter portion 20 of the tube main body 16. In consequence, the gas evaporated from the fuel stored in the fuel tank 94 is prevented from leaking from the air passage 26. That is, the filler cap 10 of the fuel tank 94 is not provided with the grooves 24 formed at the protrusions 23 of the inner lid 14 disposed in Embodiment 1, but since the enlarged portion 71 of the pipe 70 is slidably brought into close contact with the reduced diameter portion 20 of the tube main body 16, the gas is prevented from leaking from the air passage 26.

Furthermore, the center of the outer lid 12 of the cap main body 11 is provided with the pipe 70 rotatably connected to the hose 74. In consequence, the gas evaporated from the fuel stored in the fuel tank 94 can be introduced into the canister 98 or the vaporizer 92 via the hose 74, and burnt by an engine 90. When the fuel tank 94 is filled with the fuel, the filler cap 10 can be rotated while the hose 74 remains to be fixed. Therefore, the filler cap 10 can easily detachably be attached to a fuel inlet 95 of the fuel tank.

As described above, the pipe 70 is disposed which is rotatably attached to the cap main body 11 to communicate with the air passage 26 and which can be connected to the canister 98 or the vaporizer 92 via the hose 74. In consequence, the gas evaporated from the fuel stored in the fuel tank 94 mounted on a car 100 can be introduced into the pipe 7Q disposed at the cap main body 11. The gas evaporated from the fuel stored in the fuel tank 94 can be burnt by the engine 90 of the car 100 via the canister 98 or the vaporizer 92. Therefore, it can securely be prevented that environmental pollution is caused by a VOC gas generated from the fuel stored in the fuel tank and discharged from the air passage 26 to the atmosphere.

Moreover, since the pipe 70 is rotatably connected to the cap main body 11, the filler cap 10 can be rotated in a state in which the pipe 70 is supported in one direction. In consequence, without removing the hose 74 from the filler cap 10 (the pipe 70), the cap main body 11 can be rotated and detachably attached to the fuel inlet 95 of the fuel tank. Therefore, when the fuel tank 94 is filled with the fuel, a troublesome operation of removing the hose 74 from the cap main body 11 is not necessary, and convenience of the filler cap 10 of the fuel tank 94 can largely be improved.

Especially, the gas evaporated from the fuel stored in the fuel tank 94 can enter the canister 98 and the vaporizer 92 from the pipe 70 attached to the cap main body 11. Therefore, the gas evaporated from the fuel tank 94 can remarkably easily be burnt by the engine 90. In consequence, the environmental pollution due to the VOC gas generated from the fuel can be prevented. When the filler cap 10 is simply replaced without modifying the conventional fuel tank 94, the gas evaporated from the fuel stored in the fuel tank 94 can enter the canister 98 and the vaporizer 92. Therefore, cost can largely be reduced. In consequence, since the VOC gas generated from the fuel stored in the fuel tank 94 can be burnt by the engine 90 without being discharged from the air passage 26 to the atmosphere, the convenience of the filler cap 10 of the fuel tank 94 can generally be improved. The environmental pollution can further be prevented.

Furthermore, a disadvantage is prevented that the filler cap 10 is provided with a valve mechanism portion 28 and that the fuel stored in the fuel tank 94 flows from the air passage 26 disposed at the cap main body 11 owing to the valve mechanism portion 28. In consequence, since the VOC gas generated from the fuel stored in the fuel tank 94 can be burnt by the engine 90 via the pipe 70 attached to the cap main body 11, the VOC gas can be prevented from being discharged from the air passage 26 to the atmosphere. Therefore, the const increase of the fuel tank 94 is suppressed, and the filler cap 10 of the fuel tank 94 having a satisfactory appearance can be provided.

In addition, in a case where a piston 40 is provided with the function of a float 32 and the fuel enters the tube main body 16, the piston 40 also obtains buoyancy to flow toward the outside together with the float 32. Therefore, it is possible to push up a spherical member 30 toward the insertion hole 22 with the buoyancies of both the float 32 and the piston 40. In consequence, since the spherical member 30 is pressed onto the reduced diameter portion 20 of the tube main body 16, the air passage 26 can be closed. Therefore, even when the fuel tank 94 tilts and the fuel enters the tube main body 16, it is possible to effectively inhibit the fuel from flowing from the air passage 26.

Embodiment 3

Next, FIGS. 15 to 33 show a filler cap 10 of a fuel tank 94 according to another embodiment of the present invention. The filler cap 10 of the fuel tank 94 substantially has the same constitution as that of the above embodiment. Different parts will hereinafter be described. It is to be noted that the same parts as those of the above embodiment are denoted with the same reference numerals and description thereof is omitted.

Figure 15:
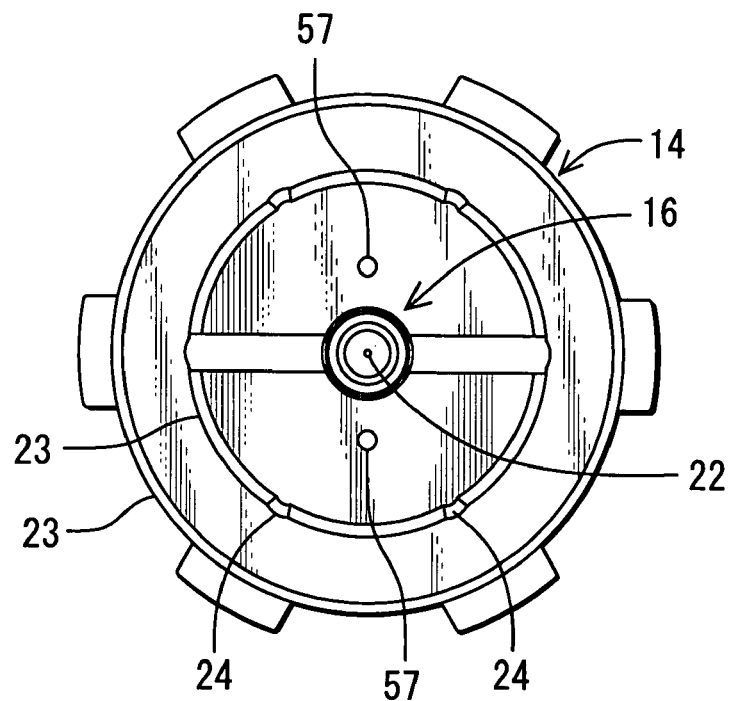
FIG. 15 is a back view of an inner lid constituting a filler cap of a fuel tank according to the present invention (Embodiment 3)

As shown in FIG. 15, an inner lid 14 of the filler cap 10 is provided with a hollow tube main body 16 substantially positioned at the center. A piston 40 disposed at the tube main body 16 is divided into two in a vertical direction (directions of a float 32 and a base plate 51), an upper piston (on the side of the float 32) is provided with a small diameter portion 40B, and a lower piston is provided with an intermediate diameter portion 40C having an outer diameter larger than that of the small diameter portion 40B and a large diameter portion 40E (corresponding to a closing portion of the present invention). It is to be noted that the piston 40 will be described later in detail.

Figure 16:
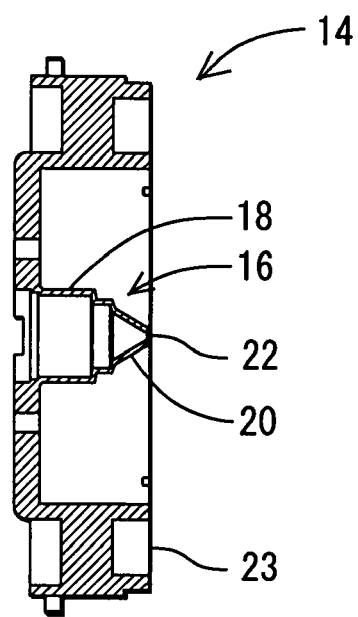
FIG. 16 is a vertically sectional view of the inner lid of FIG. 15.

As shown in FIG. 16, the tube main body 16 on one side (the left side in the drawing) is provided with a cylindrical tube-like portion 18, and a reduced diameter portion 20 is formed continuously from this tube-like portion 18 on the other side (the right side in the drawing). This tube-like portion 18 is formed into a predetermined length and a predetermined diameter, Moreover, the reduced diameter portion is formed into a conical shape whose diameter decreases as the reduced diameter portion comes away from the tube-like portion 18.

The reduced diameter portion 20 is provided with an insertion hole 22 formed away from the tube-like portion 18 so as to extend through the reduced diameter portion, and this insertion hole 22 allows the inside of the tube main body 16 to communicate with the outside. One side surface of the inner lid 14 (the surface on an insertion hole 22 side) is provided with a plurality of (two in the embodiment) annular protrusions 23 centering on the insertion hole 22 and having a predetermined width, a predetermined height and a predetermined diameter (shown in FIGS. 15, 16).

Figure 17:
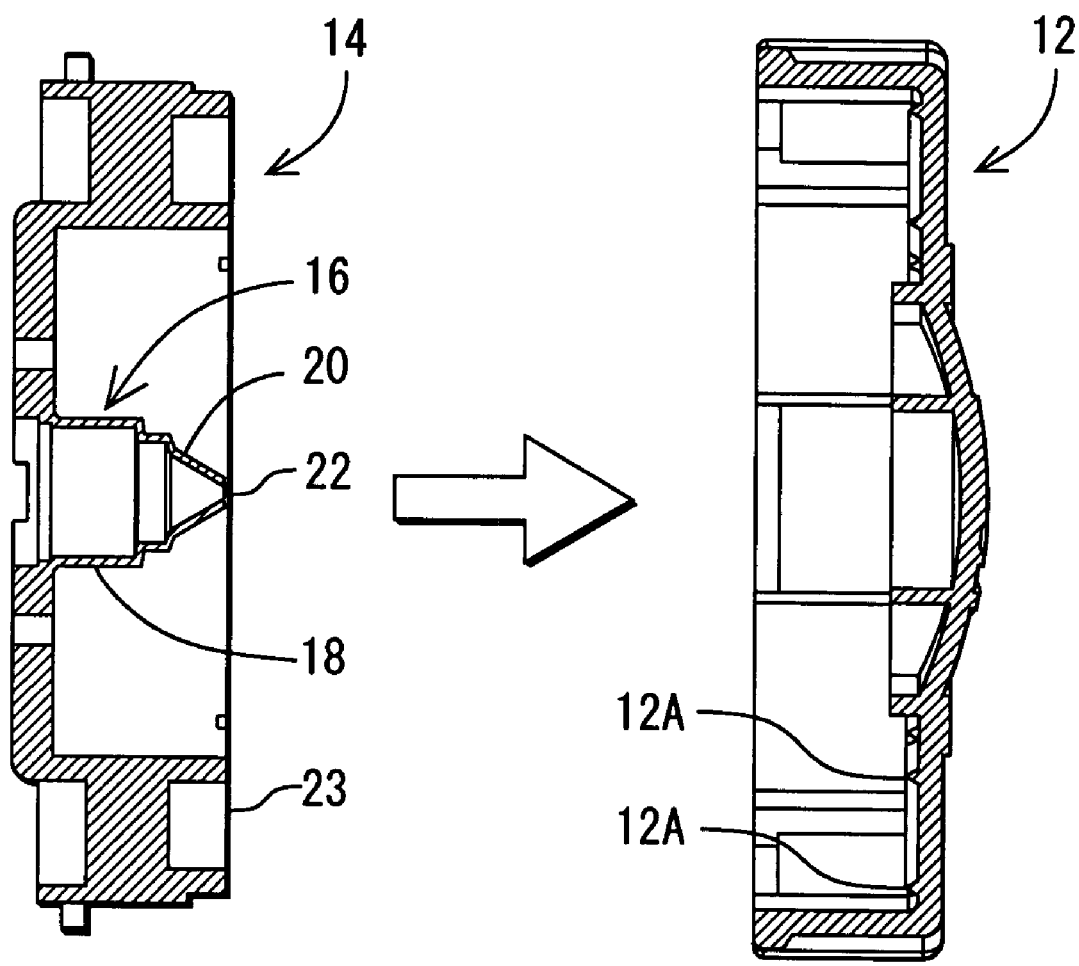
FIG. 17 is an assembly diagram of an outer lid and the inner lid constituting the filler cap of the fuel tank according to the present invention.
Figure 18:
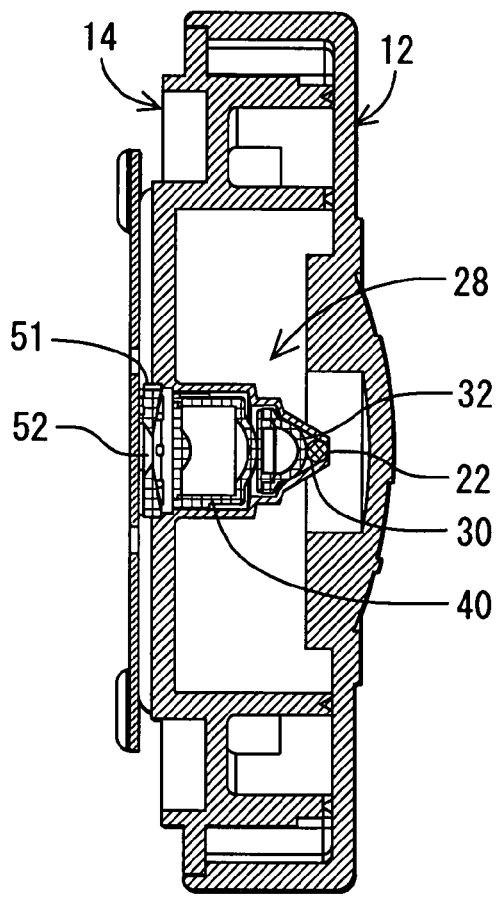
FIG. 18 is a longitudinal side view of the filler cap of the fuel tank according to the present invention.
Figure 19:
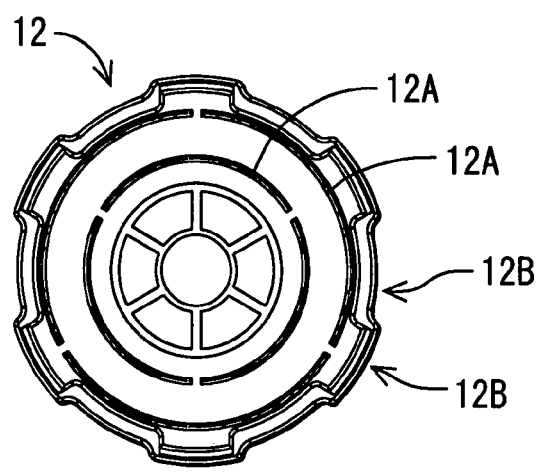
FIG. 19 is a back view of the outer lid constituting the filler cap of the fuel tank according to the present invention.

Moreover, as shown by a white arrow in FIG. 17, the inner lid 14 is inserted into an outer lid 12 from the side of the annular protrusions 23, and the inner lid 14 is welded and fixed to the outer lid 12 with an ultrasonic wave. That is, the outer lid 12 is provided with a plurality of annular ultrasonic ribs 12A (shown in FIG. 19) which slightly protrude toward the inner lid 14, and these ultrasonic ribs 12A are welded and fixed to the annular protrusions 23 of the inner lid 14 with the ultrasonic wave. At this time, an outer peripheral edge of the inner lid 14 is welded and fixed to the outer lid 12 with the ultrasonic wave. In consequence, the inner lid 14 is firmly fixed to the outer lid 12 (FIG. 18).

Figure 20:
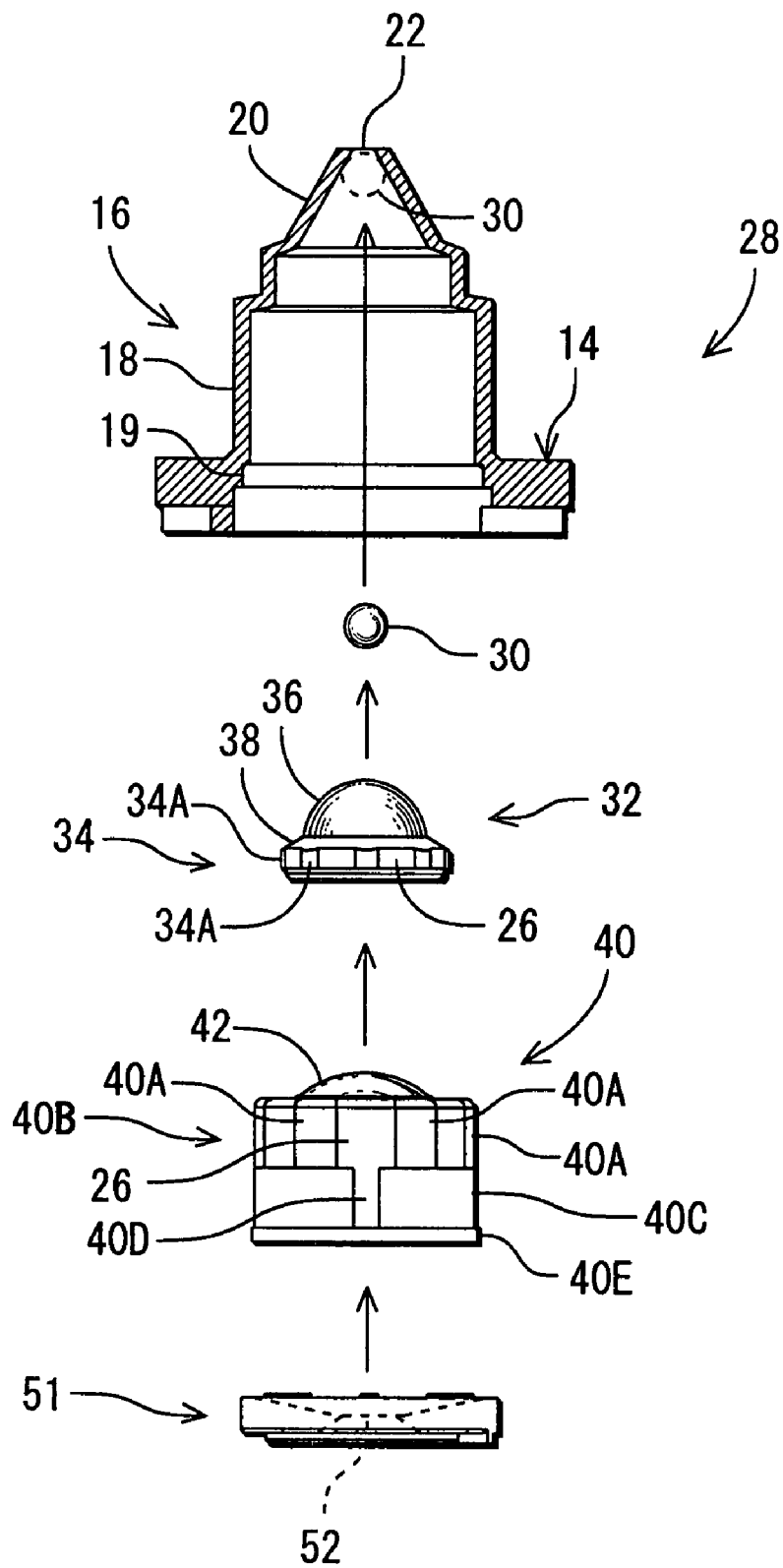
FIG. 20 is an assembly diagram of a main part (a valve mechanism portion constituted in an air passage) of the filler cap of the fuel tank according to the present invention.

As shown in FIG. 20, a valve mechanism portion 28 is disposed at the tube main body 16. This valve mechanism portion 28 includes the tube-like portion 18, a spherical member 30 disposed at this tube-like portion 18, the float 32, the piston 40 provided with a float function (buoyancy) and the base plate 51. It is to be noted that FIG. 20 shows the tube main body 16 in a vertically sectional view, and shows other components in a front view.

Here, the fuel (gasoline) has a specific gravity of 0.6 to 0.8%. Moreover, the piston 40 has such buoyancy as to lift up a whole of the piston 40 itself and a combined weight of the float 32 and the spherical member 30. In other words, the piston 40 has such buoyancy as to press the spherical member 30 onto the inner surface of the reduced diameter portion 20. For example, in a case where it is assumed that an inner volume of the piston 40 is about 1.3893 cubic cm, the whole mass is 0.6171 g and the whole specific gravity is 0.4442, the buoyancy (when the piston 40 is immersed into the fuel) is about 0.9725 gf. The buoyancy at a time when the whole piston 40 is immersed in the fuel (a force applied upwards by the piston 40) is 0.355 gf . . . (1).

Moreover, the weight of the spherical member 30 immersed into the fuel is 0.0638 g in a case where the spherical member 30 is a stainless ball having a diameter of about 2.5 mm, the float 32 has a weight of 0.2003 g and a total weight of the spherical member 30 and the float 32 is 0.2641 g. A force applied downwards by the spherical member 30 and the float 32 (a force applied downwards by the spherical member 30 and the float 32 in air) is 0.2641 gf . . . (2). At this time, a force of (1)-(2) is applied upwards to the spherical member 30. That is, the spherical member 30 has such a float function that the spherical member floats upwards by the piston 40 with a force of 0.0913 gf. The buoyancy of the float 32 functions until an air passage 26 of the tube main body 16 is closed with the large diameter portion 40E described later. Subsequently, the piston 40 is moved (pushed) toward the insertion hole 22 at a liquid pressure of the fuel which has risen above the filler cap 10.

Figure 21:
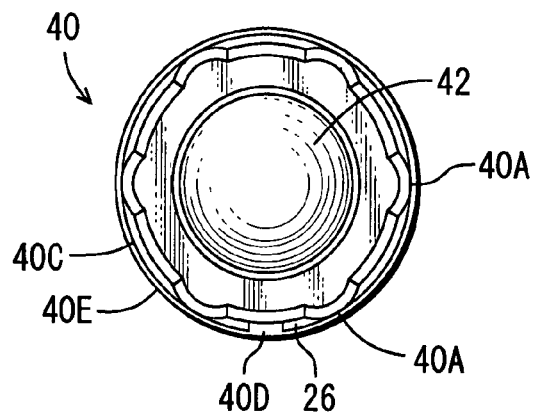
FIG. 21 is a plan view of a piston constituting the filler cap of the fuel tank according to the present invention.
Figure 22:
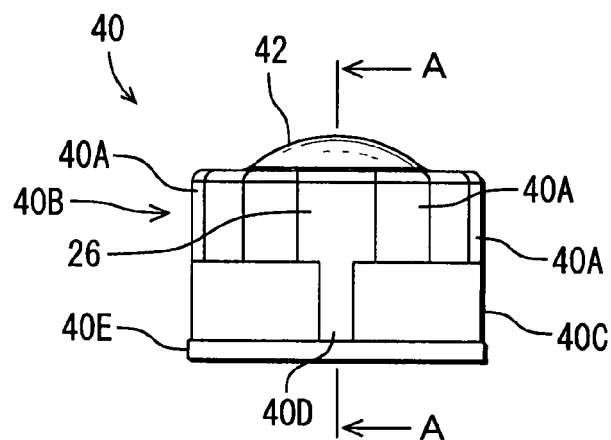
FIG. 22 is a front view of the piston constituting the filler cap of the fuel tank according to the present invention.
Figure 23:
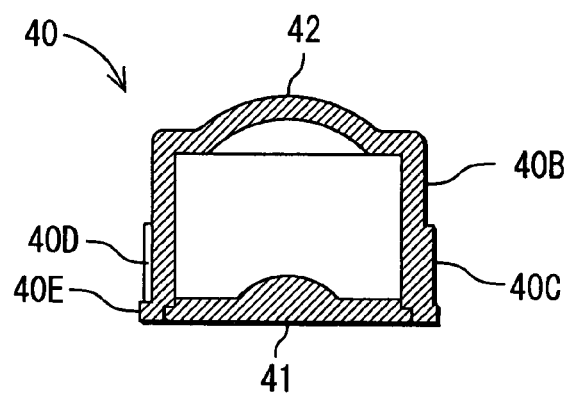
FIG. 23 is a view of the piston taken along the B-B line of FIG. 22.

As shown in FIGS. 21, 22 and 23, the piston 40 is provided with a protrusion 42 which protrudes on one side (an upper side in FIGS. 22, 23) to constitute a part of a spherical shape, and the surface of this protrusion 42 on an opposite side is fixedly sealed with and welded to a lid member 41 which closes a lower opening of the piston 40 with an ultrasonic wave. That is, since the opposite surface of the protrusion 42 is sealed with the lid member 41, the piston 40 is provided with the function of the float. This protrusion 42 is constituted so that the piston 40 comes in point contact with the float 32.

Moreover, an outer peripheral surface of the small diameter portion 40B of the piston 40 is provided with vertical ribs 40A which extend in a longitudinal direction of the tube-like portion 18, and the vertical ribs 40A extend from the side of the protrusion 42 to the intermediate diameter portion 40C. A plurality of vertical ribs 40A are arranged at a substantially equal interval at a periphery of the small diameter portion 40B, and formed into a width of about 1.0 mm and a thickness of about 0.2 mm in the same manner as in the vertical ribs 40A of the above embodiment. Eight vertical ribs 40A are arranged at the substantially equal interval on the periphery of the small diameter portion 40B, and formed into a hog-backed sectional shape.

The vertical ribs 40A bring the piston 40 inserted into the tube-like portion 18 into linear contact with the inner surface of the tube-like portion 18 to reduce a contact resistance in a case where the piston 40 vertically moves. In consequence, a frictional resistance with respect to the inner surface of the tube-like portion 18 is reduced. Therefore, the piston 40 and the inner surface of the tube-like portion 18 are prevented from being adsorbed by the fuel. A gap between the inner surface of the tube-like portion 18 and the vertical ribs 40A is set to a small gap in which the piston 40 can vertically move, and falling of the piston 40 is reduced.

Moreover, when the air passage 26 is closed with the spherical member 30 pressed onto the inner surface of the reduced diameter portion 20 by the piston 40, a gas (a residual gas) of the tube-like portion 18 is contained in the tube-like portion 18, and inhibited from leaking from the insertion hole 22. The gas contained in the tube-like portion 18 is compressed, when the piston 40 moves owing to a liquid pressure of the fuel of the fuel tank 94. Moreover, when a balance between an inner pressure of the tube-like portion 18 and an inner pressure of the fuel tank 94 is established, the air passage 26 of the reduced diameter portion 20 is closed with the spherical member 30 owing to the liquid pressure of the fuel tank 94.

In a case where the air passage 26 of the reduced diameter portion 20 is closed with the spherical member 30 late, the gas of the tube-like portion 18 is discharged from the insertion hole 22. When the gas is discharged from the insertion hole 22, the gas is compressed late in the tube-like portion 18 by the piston 40, and the fuel invades the tube-like portion 18 from an air passing groove 40D. Therefore, the air passage 26 of the reduced diameter portion 20 needs to be closed faster before the fuel invades the tube-like portion 18 from the air passing groove 40D. The piston 40 provided with the float function is remarkably effective in closing the air passage 26 disposed at the inner surface of the reduced diameter portion 20 with the spherical member 30.

It is to be noted that, in a case where the piston 40 is not provided with the float function, weights of the piston 40, the float 32 and the spherical member 30 have to be moved toward the insertion hole 22 owing to the buoyancy of the float 32 and a jetting pressure of the fuel to be jetted only. Therefore, an amount of the fuel to be introduced into the tube-like portion 18 increases, and a time required until the spherical member 30 is pressed onto the inner surface of the reduced diameter portion 20 to close the air passage 26 also increases. In a case where the fuel enters the tube-like portion 18 above the piston 40 and an inner pressure of the tube-like portion 18 becomes equal to that of the tank, since a weight of the piston 40 which is not provided with the float function is larger than the specific gravity of the fuel, the gravity is applied to the side of the fuel tank 94, and a pressure applied to the spherical member 30 is reduced.

Moreover, when the gravity of the piston 40 is applied toward the fuel tank 94 and the piston 40 moves toward the fuel tank 94, the spherical member 30 cannot securely be pressed toward the insertion hole 22 only with the buoyancy of the float 32 alone. In actual, it is hardly considered that the fuel tank 94 (an engine 90) is tilted for use for a long time. However, in a case where the piston 40 is not provided with the float function, if a long time (e.g., 15 minutes or more) elapses after the fuel tank 94 tilts or falls, the fuel sometimes weeps from the insertion hole 22.

To solve the problem, Embodiment 3 is provided with the piston 40 having the float function. In consequence, in a case where the fuel tank 94 tilts and the fuel enters a bottom portion of the piston 40, the buoyancy is instantly generated in the piston 40 to press the spherical member 30 onto the inner surface of the reduced diameter portion 20 and close the air passage 26 of the reduced diameter portion 20. It is to be noted that the residual gas of the tube-like portion 18 hardly flows outwards. Therefore, the residual gas of the tube-like portion 18 is compressed to achieve a balance between the inner pressure of the tube-like portion 18 and the inner pressure of the fuel tank 94.

Figure 24:
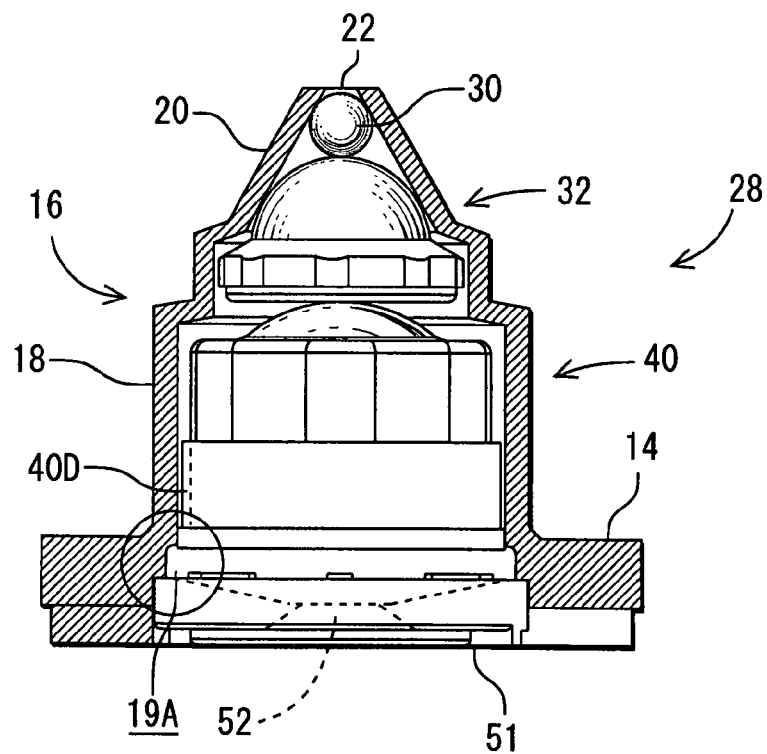
FIG. 24 is a diagram showing a state (a state in which the air passage is opened) in which a spherical member is pressed onto an inner surface of a reduced diameter portion at a time when the piston rises.

When a valve of the valve mechanism portion 28 closes (in a state in which the spherical member 30 is pressed onto the inner surface of the reduced diameter portion 20 to close the air passage 26), the spherical member 30 is substantially positioned at a vertex of the center of a semispherical portion 36 of the float 32 (shown in FIG. 24). Moreover, when the valve opens, the spherical member 30 drops down from the vertex of the center of the semispherical portion 36 toward a tube portion 34 (shown in FIG. 28). In this case, since the semispherical portion 36 of the float 32 is formed into a semispherical shape, the spherical member 30 drops down in either direction of the semispherical portion 36. A distance between the insertion hole 22 and the spherical member 30 at a time when the spherical member 30 drops down in either direction of the semispherical portion 36 can be set to be larger than that between the insertion hole 22 and the spherical member 30 at a time when the spherical member 30 is positioned at the vertex of the semispherical portion 36 (a position closest to the insertion hole 22).

Moreover, in relation to an outer shape of the piston 40, an outer diameter of the float 32 is formed to be smaller than that of the piston 40. Specifically, an outer shape of the float 32 is formed to be about ⅘ of that of the piston 40. Therefore, the tube main body 16 (an inner diameter of the tube-like portion 18) is formed in accordance with the outer shapes of the float 32 and the piston 40. In consequence, a weight of the float 32 is set to be largely smaller than that of the piston 40. Moreover, when the fuel tank 94 tilts, a liquid pressure of the fuel entering the filler cap 10 (the valve mechanism portion 28) is comparatively small, but the piston 40 can push up the float 32 and the spherical member 30 owing to the buoyancy and the liquid pressure. It is to be noted that inner diameters of the piston 40, the float 32 and the tube-like portion 18 may be constituted in the same manner as in Embodiments 1, 2.

That is, in a case where the fuel which has entered the valve mechanism portion 28 has a small liquid pressure, an only small liquid pressure functions to raise the piston 40, and the piston 40 rises toward the insertion hole 22 at a delayed speed. Therefore, a possibility is considered that the pressure to press the spherical member 30 onto the inner surface of the reduced diameter portion 20 (the pressure to close the air passage 26 disposed at the reduced diameter portion 20) also decreases and that the fuel leaks from the insertion hole 22. To solve the problem, the spherical member 30 needs to be quickly pressed onto the inner surface of the reduced diameter portion 20 to close the air passage 26, and the leakage of the fuel from the insertion hole 22 needs to be reduced.

Moreover, in a case where the inner portion of the piston 40 is constituted to be hollow, the buoyancy can be increased as compared with the piston is not hollow (the piston strengthens the function of the float). As described above in Embodiments 1, 2, the piston 40 is constituted into a cylindrical bottomed container having one opened side. In this case, in a case where the fuel enters the valve mechanism portion 28 at a time when the fuel tank 94 tilts, the piston 40 is raised owing to the jetting pressure of the fuel, and the float 32 and the spherical member 30 are pushed up by the raised piston 40 to press the spherical member 30 onto the inner surface of the reduced diameter portion 20 and close the air passage 26 of the reduced diameter portion 20. However, at an outer periphery of the piston 40, a gap between each of the vertical ribs 40A and the inner surface of the tube-like portion 18 is constituted to be large, and a length of the piston 40 (in a direction between the fuel tank 94 and the insertion hole 22) is constituted to be smaller than that of the piston 40 of Embodiment 3.

Furthermore, in Embodiments 1, 2, in a case where the fuel tank 94 tilts, when the fuel invading the valve mechanism portion 28 reaches an upper portion of the piston 40 from the gap between the vertical ribs 40A and the gap between the vertical ribs and the inner surface of the tube-like portion 18 of the tube main body 16, the inner pressure of the tube-like portion 18 becomes equal to that of the tank. At this time, since the piston 40 is formed into the cylindrical bottomed container having one opened side, the piston hardly has buoyancy, and the weight of the piston is larger than the specific gravity of the fuel. The piston 40 moves (drops down) toward the tank owing to the weight of the piston itself, the force to press the spherical member 30 onto the inner surface of the reduced diameter portion 20 includes the only buoyancy of the float 32. Therefore, a possibility is considered that the pressure to press the spherical member 30 onto the inner surface of the reduced diameter portion 20 is reduced and that the fuel weeps from the insertion hole 22.

To solve the problem, in Embodiment 3, the piston 40 is constituted to be hollow and provided with the buoyancy (the float function), and the piston 40 is constituted so as to float in the fuel by use of the buoyancy of the piston. In this case, an element to float the piston 40 is a height of the liquid surface of the fuel stored in the fuel tank 94 with respect to a position of the filler cap 10 (a weight of the fuel applied to the piston 40). When a height of the fuel stored in the fuel tank 94 increases on the basis of the filler cap 10, the pressure of the fuel is applied to the filler cap 10. That is, when the liquid surface of the fuel rises above the filler cap 10, a differential pressure of the liquid surface is applied to the piston 40 to compensate for the height of the liquid surface.

Moreover, to increase the buoyancy of the piston 40, when the piston 40 is lengthened in the longitudinal direction of the tube main body 16 to increase a capacity and the fuel enters the gap between the piston and the inner surface of the tube-like portion 18, the inner surface of the tube-like portion 18 and the piston 40 are easily adsorbed. When the inner surface of the tube-like portion 18 and the piston 40 are adsorbed and the tilted fuel tank 94 returns to a horizontal state, the float 32 and the spherical member 30 do not easily drop down toward the fuel tank 94 owing to the adsorption of the piston 40. To solve the problem, in Embodiment 3, the length of the piston 40 is constituted to be shorter than a diametric dimension of the piston 40, and a bottom area of the piston 40 (an area on the fuel tank 94 side) is increased. In consequence, the buoyancy of the piston 40 is increased by the incoming fuel.

That is, the piston 40 is constituted of the hollow sealed container, and the length dimension is set to be shorter than the diametric dimension to generate a large buoyancy in the piston 40. A thickness of the tube portion 34 constituting the float 32 (in the longitudinal direction of the tube main body 16) is constituted to be smaller than a radius of the semispherical portion 36. In consequence, the float 32 and the spherical member 30 can be pressed onto the inner surface of the reduced diameter portion 20 with the only buoyancy of the piston 40 to close the air passage 26 of the reduced diameter portion 20 and securely prevent the leakage of the fuel from the insertion hole 22. When the fuel enters the valve mechanism portion 28, the movement of the piston 40 toward the fuel tank 94 due to the weight of the piston can be prevented by the buoyancy of the piston 40.

Moreover, the piston 40 is constituted so that the total weight of the piston 40, the float 32 and the spherical member 30 is set to a capacity (buoyancy) capable of sufficiently floating. This piston 40 is constituted so as to have a bottom area and a length sufficient for momentarily generating the buoyancy in a case where the fuel enters the bottom portion. Moreover, the inner portion of the piston is constituted to be hollow to achieve a structure in which the buoyancy can firmly be secured. The piston 40 is formed into a cylindrical shape having a length of about 8.2 mm. The gap between this piston 40 and the inner surface of the tube main body 16 is constituted into a gap through which the fuel can flow. Moreover, when the piston 40 moves toward the outside (toward the insertion hole 22), the gap between the piston 40 (the large diameter portion 40E) and the inner surface of the tube main body 16 is constituted into such a dimension that the fuel cannot flow through the space before the spherical member 30 is pressed onto the inner surface of the reduced diameter portion 20 of the tube main body 16 by the float 32.

Specifically, the piston 40 is divided into two in the vertical direction (the directions of the float 32 and the base plate 51), the upper piston (on the side of the float 32) is provided with the small diameter portion 40B, and the lower piston is provided with the intermediate diameter portion 40C having the outer diameter larger than that of the small diameter portion 40B and the large diameter portion 40E. The small diameter portion 40B is formed into a cylindrical shape having a diameter of about 12.4 mm, the intermediate diameter portion 40C is formed into a shape having a slightly large diameter of about 13.1 mm, and the large diameter portion 40E is formed into a shape having a further larger diameter. It is to be noted that the periphery of the small diameter portion 40B is provided with the vertical ribs 40A in the same manner as in the vertical ribs 40A described above in order to secure the gap for preventing the adsorption onto the inner surface of the tube-like portion 18 (shown in FIG. 20).

Moreover, the large diameter portion 40E is continuously disposed under the intermediate diameter portion 40C, and this large diameter portion 40E is formed into a diameter which is about 0.06 mm larger than that of the intermediate diameter portion 40C. A dimension (a thickness dimension) of the small diameter portion 40B in the vertical direction is set to about 4.0 mm, the dimension of the intermediate diameter portion 40C is set to 3.4 mm and the dimension of the large diameter portion 40E is set to about 0.8 mm. The small diameter portion 40B is peripherally provided with the air passage 26 constituted of the vertical ribs 40A in the same manner as in the piston 40 described above.

Furthermore, peripheries of the intermediate diameter portion 40C and the large diameter portion 40E are not provided with the vertical ribs 40A, and are constituted into a flat cylindrical shape. In consequence, the gap between the intermediate diameter portion 40C and the inner surface of the tube-like portion 18 is constituted into such a dimension that the fuel cannot flow through the gap and the only gas evaporated from the fuel tank 94 can flow through the gap. The gap between the large diameter portion 40E and the inner surface of the tube-like portion 18 is constituted into such a dimension that the fuel cannot flow through the gap and the gas evaporated from the fuel tank 94 can hardly pass through the gap as compared with the intermediate diameter portion 40C.

In addition, the side surface of the piston 40 (the intermediate diameter portion 40C) is provided with the air passing groove 40D (corresponding to the fuel passage permitting portion through which the fuel can flow according to the present invention) which constitutes a part of the air passage 26. This air passing groove 40D is constituted into a width of about 1.2 mm and a depth of about 0.3 mm. Moreover, the air passing groove extends from a portion which comes in contact with the large diameter portion 40E toward the vertical ribs 40A. That is, the air passing groove 40D is closed with the large diameter portion 40E on the fuel tank 94 side and opens between the vertical ribs 40A on the insertion hole 22 side.

Moreover, the large diameter portion 40E is constituted into such an outer diameter that the large diameter portion is disposed closer to the inner surface of the tube main body 16 than the air passing groove 40D as described above. Furthermore, the gap between the large diameter portion 40E and the inner surface of the tube main body 16 during usual use of the car 100 (corresponding to "constantly" according to the present invention) is constituted into such a dimension that the fuel can flow through the gap. When the piston 40 is moved toward the insertion hole 22, the large diameter portion is moved to a such position as to face the inner surface of the tube main body 16, and the space between the large diameter portion and the inner surface of the tube main body 16 is constituted into such a dimension that the fuel cannot flow through the space.

Furthermore, in the tube main body 16, a stepped portion 19 is continuously formed under the tube-like portion 18 (on the fuel tank 94 side), an inner diameter of the tube-like portion 18 is set to about 10 mm, and an inner diameter of the stepped portion 19 is formed into a larger diameter of 11 mm. That is, a gap through which the piston can vertically move is secured between a lower portion of the piston 40 (on the base plate 51 side) and the inner surface of the tube-like portion 18 of the tube main body 16 to secure movement at a time when the fuel tank 94 tilts. A periphery of the lower portion of the piston 40 is provided with a gap through which the fuel does not flow and through which a toxic gas generated from the fuel tank 94 flows. Moreover, the periphery of the lower portion of the piston has a gap through which the piston can move even when the fuel tank 94 tilts.

In addition, when the float 32 is pushed up by the piston 40 to press the spherical member 30 onto the inner surface of the reduced diameter portion 20, a space portion 19A is formed at the stepped portion 19. In a case where the piston 40 rises to close the air passage 26 with the spherical member 30 pressed onto the inner surface of the reduced diameter portion 20, a facing surface between the peripheral surface of the large diameter portion 40E and the inner surface of the lower portion of the tube main body 16 is cancelled to form the air passage 26. For this purpose, a stroke of the piston 40 is set to be larger than a thickness of the large diameter portion 40E. That is, if the stepped portion 19 is not constituted to be larger than outer peripheral diameters of the piston 40 and the large diameter portion 40E of the lower portion of the tube main body 16 and a width of the stepped portion is not larger than that of the large diameter portion 40E, the inside of the fuel tank 94 cannot communicate with the insertion hole 22 via the air passage 26.

Next, the dimension between the tube-like portion 18 and the piston 40 through which the fuel between the large diameter portion 40E and the inner surface of the tube main body 16 can flow and the position of the piston 40 including the dimension between the tube-like portion 18 and the piston 40 through which the fuel cannot flow will specifically be described. A position (1) of the piston 40 at a time when the float 32 is pushed upwards by the piston 40 to move to an uppermost portion, a position (2) of the piston 40 between the uppermost portion and a lowermost portion and a position (3) of the piston 40 moved to the lowermost portion will be described in order.

(1) The Position of the Piston 40 Moved to the Uppermost Portion

Figure 25:
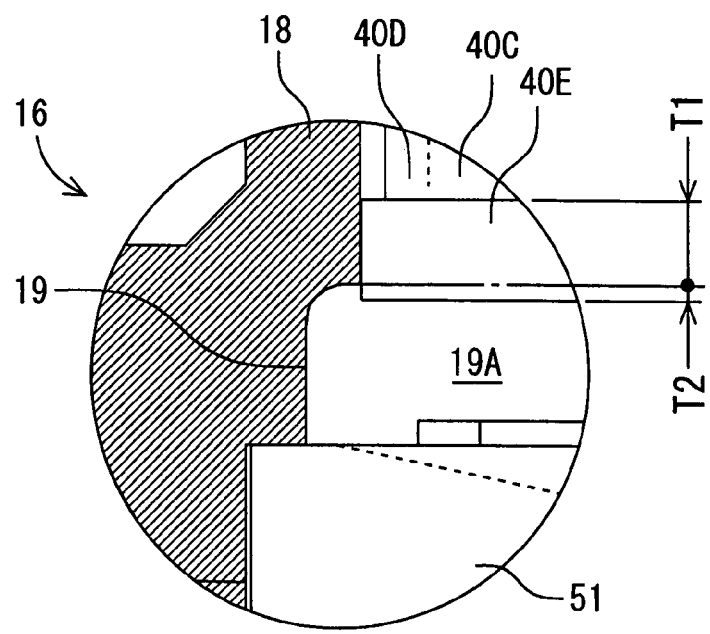
FIG. 25 is an enlarged view of a circled portion (a skirt portion) of FIG. 24.

When the piston 40 pushes up the float 32 to press the spherical member 30 onto the inner surface of the reduced diameter portion 20, as shown in FIGS. 24, 25, the outer peripheral surface of the large diameter portion 40E constituting the piston 40 faces the inner surface of the tube-like portion 18. At this time, the lower portion of the large diameter portion 40E protrudes toward the space portion 19A as much as ⅕ of a thickness of the large diameter portion 40E. In this case, a portion of the large diameter portion 40E having a thickness of ⅘ of that of the large diameter portion (T1 of FIG. 25) faces the inner surface of the tube-like portion 18. A portion of the large diameter portion having a thickness of ⅕ of that of the large diameter portion (T2 of FIG. 25) faces the stepped portion 19.

Moreover, in a state in which the piston 40 moves toward the insertion hole 22 and the large diameter portion 40E faces the inner surface of the tube-like portion 18, the gap between the inner surface of the tube-like portion 18 and an outer surface of the large diameter portion 40E has a such a dimension that the fuel does not flow through the gap. At this time, the piston 40 is provided with buoyancy corresponding to a portion of the piston protruding from the tube-like portion 18 toward the large diameter portion 40E. Furthermore, when the fuel enters the space portion 19A, the gap between the inner surface of the tube-like portion 18 and the large diameter portion 40E is sealed owing to permeation of the fuel (the gap between the large diameter portion 40E and the inner surface of the tube-like portion 18 is sealed), and movement of the fuel toward the float 32 is prevented. It is to be noted that FIGS. 24, 25 show the tube main body 16 in a vertically sectional view and show other components in a front view.

Figure 26:
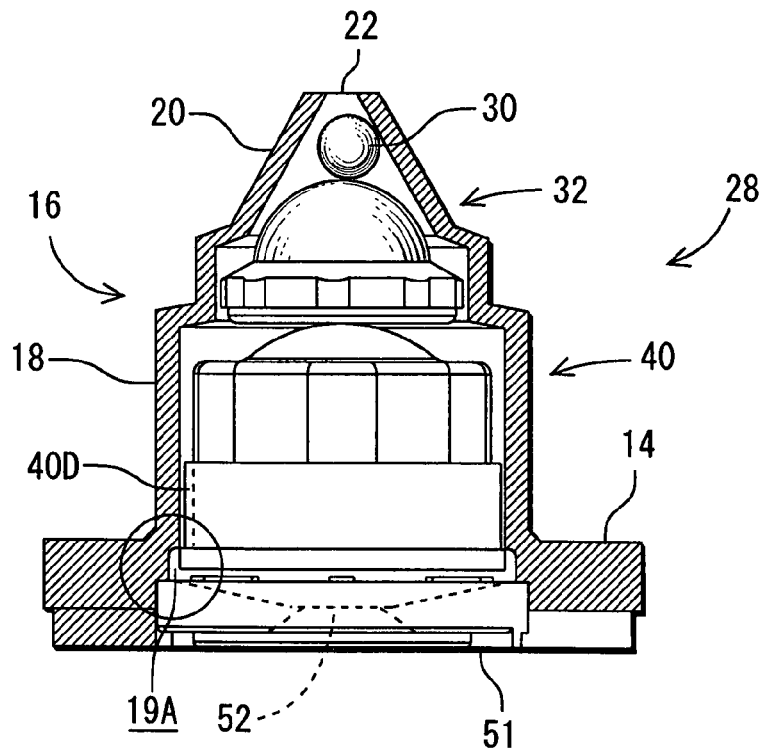
FIG. 26 is a diagram showing that the raised piston is dropping down (immediately before the air passage is opened)
Figure 27:
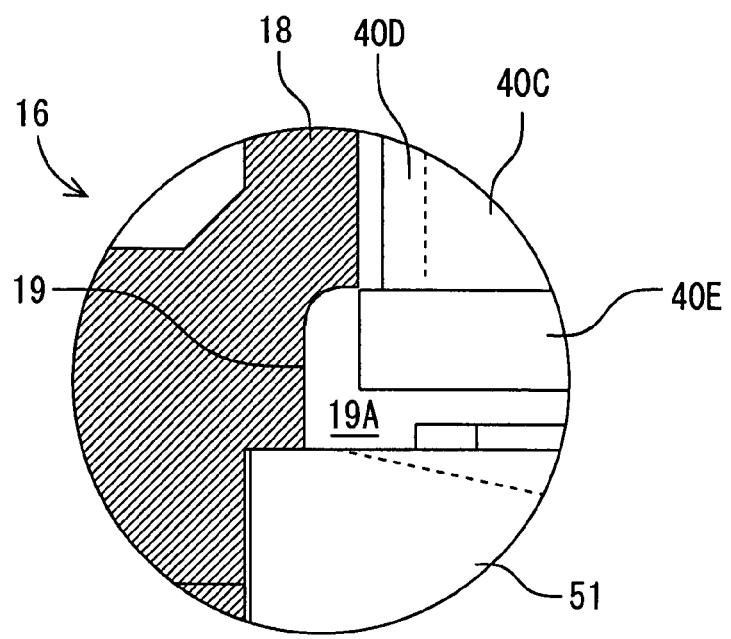
FIG. 27 is an enlarged view of a circled portion (a skirt portion) of FIG. 26.

(2) The Position of the Piston 40 Between the Uppermost Portion and the Lowermost Portion While the piston 40 pushes up the float 32 to press the spherical member 30 onto the inner surface of the reduced diameter portion 20, as shown in FIGS. 26, 27, a corner (a corner on the insertion hole 22 side) of an outer peripheral upper portion of the large diameter portion 40E constituting the piston 40 is disposed closest to a corner at which the inner surface of the tube-like portion 18 comes in contact with the stepped portion 19. That is, when the piston 40 moves up toward the insertion hole 22, the space between the large diameter portion 40E and the inner surface of the tube main body 16 is set to such a small dimension that the fuel cannot flow through the space before the spherical member 30 is pressed onto the inner surface of the reduced diameter portion 20 by the float 32. In this state, when the piston 40 slightly (e.g., 1.0 mm) moves downward (toward the fuel tank 94), the space portion 19A under the piston 40 communicates with the air passing groove 40D disposed at the side surface of the intermediate diameter portion 40C.

In consequence, the inside of the fuel tank 94 communicates with the outside via the air passage 26. When the piston 40 further moves upwards, the intermediate position of the piston between the uppermost portion and the lowermost portion is similar to the position (1). At this time, the piston 40 is provided with the buoyancy corresponding to the portion of the piston protruding from the tube-like portion 18 toward the large diameter portion 40E. It is to be noted that this also applies to a case where the piston returns toward the fuel tank 94 from the state in which the piston 40 pushes up the float 32 to press the spherical member 30 onto the inner surface of the reduced diameter portion 20. It is to be noted that FIGS. 26, 27 show the tube main body 16 in a vertically sectional view and show other components in a front view.

(3) The Position of the Piston 40 Moved to the Lowermost Portion

Figure 28:
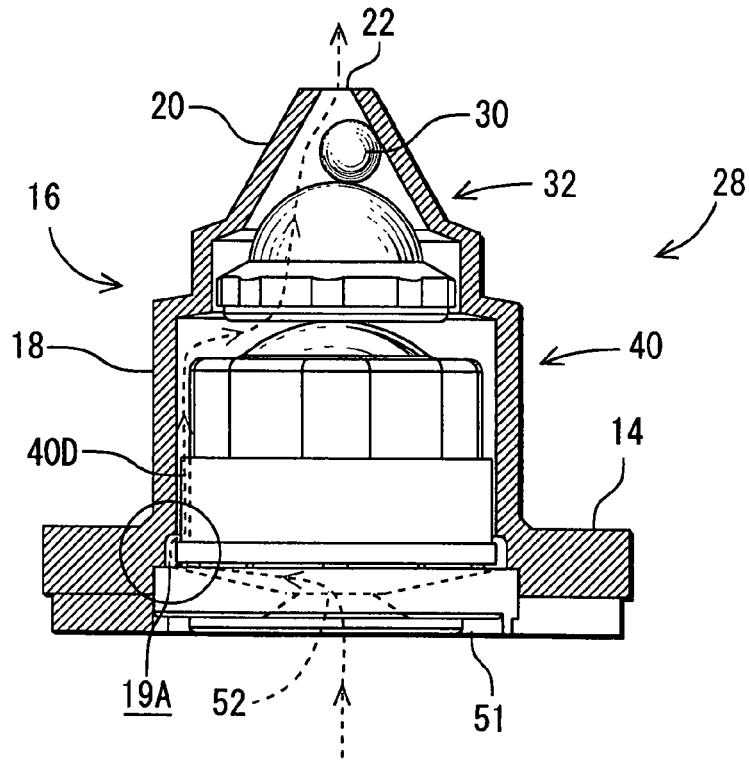
FIG. 28 is a diagram showing that the raised piston drops down to a lowermost portion (a state in which the air passage is opened)
Figure 29:
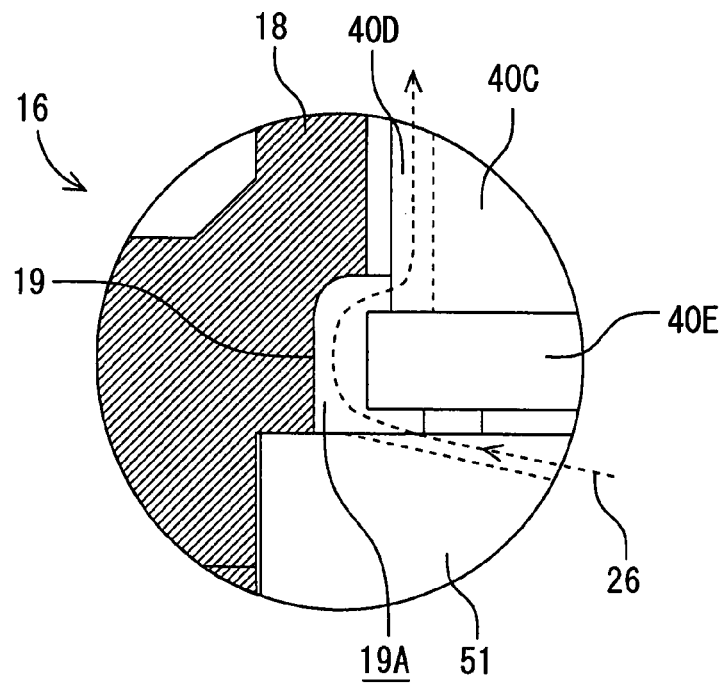
FIG. 29 is an enlarged view of a circled portion (a skirt portion) of FIG. 26.

When the piston 40 moves toward the fuel tank 94 and the spherical member 30 moves downwards from the inner surface of the reduced diameter portion 20 to open the air passage 26, as shown in FIGS. 28, 29, the outer peripheral surface of the large diameter portion 40E constituting the piston 40 faces the inner surface of the stepped portion 19. In this state, the corner (the corner on the insertion hole 22 side) of the upper portion of the outer periphery of the large diameter portion 40E constituting the piston 40 has the largest distance from the corner at which the inner surface of the tube-like portion 18 comes in contact with the stepped portion 19. At this time, between the upper and lower surfaces of the large diameter portion 40E (the tube main body 16 and the base plate 51) and the side surface (the stepped portion), the air passage 26 is constituted to be equal to or larger than the air passage 26 formed between the vertical ribs 40A disposed at the periphery of the small diameter portion 40B and the tube-like portion 18.

That is, during the usual use of the car 100, the gap between the piston 40 and the inner surface of the tube main body 16 is formed into such a dimension that the fuel can flow through the gap. In this state, the air passage 26 extends from the fuel tank 94 to pass through the lower portion of the piston 40, the space portion 19A between the large diameter portion 40E and the stepped portion 19 and the air passing groove 40D disposed at the side surface of the intermediate diameter portion 40C, and communicates with the outside from the insertion hole 22. It is to be noted that FIGS. 28, 29 show the tube main body 16 in a vertically sectional view and show other components in a front view.

Figure 30:
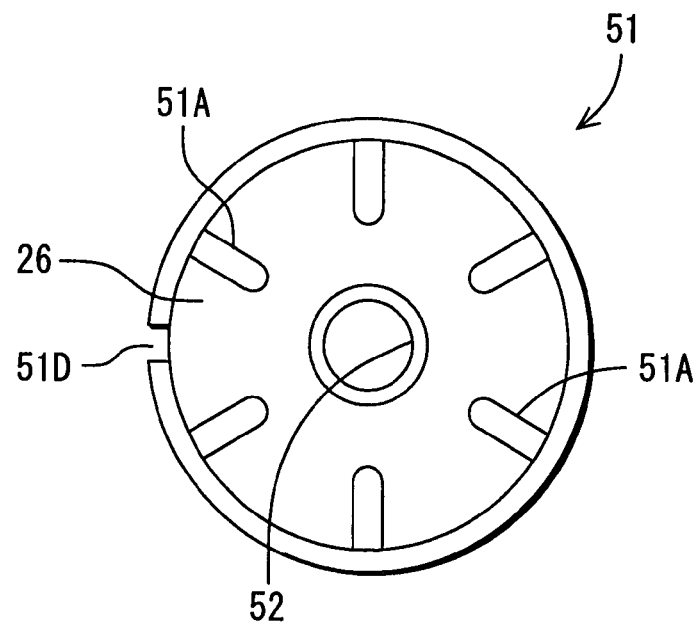
FIG. 30 is a front view of a base plate constituting the filler cap of the fuel tank according to the present invention.

On the other hand, the base plate 51 is made of a synthetic resin (nylon 6 or nylon 6, 6) which does not rust and which is not deformed or dissolved by the fuel in the same manner as in the above embodiment. This base plate 51 is formed into a diameter of about 10.2 mm and a thickness of 1.6 mm which are larger than those of the above embodiment, the a through hole 52 having a diameter of about 4.5 mm is disposed so as to extend through the center of the plate. As shown in FIG. 30, one side surface (the surface on the piston 40 side) of the base plate 51 is provided with horizontal ribs 51A formed into a hog-backed sectional shape, and the horizontal ribs 51A are formed into a width of about 1.0 mm and a thickness of about 0.8 mm. A plurality of (six in the embodiment) horizontal ribs 51A are arranged at an equal interval in a circumferential direction of the through hole 52.

The horizontal ribs 51A are arranged radially from the center, and arranged from a position including a predetermined space from the through hole 52 to a peripheral edge of the base plate 51. The horizontal ribs 51A come in contact with the piston 40, and the base plate 51 and the piston 40 are prevented from being adsorbed. This base plate 51 is fixed to the inner lid 14 via a spring 56 described later.

Figure 31:
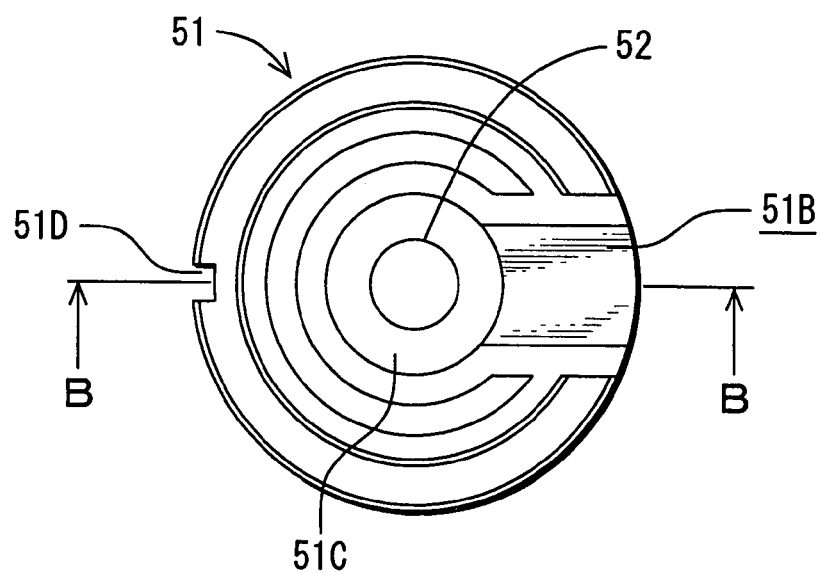
FIG. 31 is a back view of a base plate constituting the filler cap of the fuel tank according to the present invention.
Figure 32:
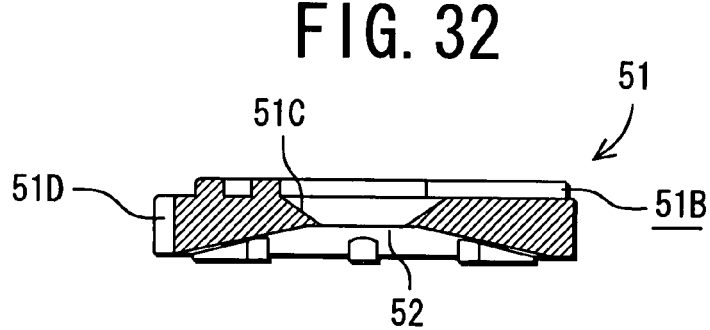
FIG. 32 is a view of the piston taken along the A-A line of FIG. 27.

Moreover, as shown in FIGS. 31, 32, the base plate 51 is provided with the through hole 52 which extends through the center of the plate. A periphery of the through hole 52 is provided with a circular concave portion 51C recessed from an outer peripheral side of the base plate 51 toward the through hole 52 and tilted. The periphery is also provided with a passage 51B extending from the circular concave portion 51C on one surface side (the fuel tank 94 side) of the base plate 51 to the outer peripheral edge portion to constitute a part of the air passage 26.

The through hole 52, the concave portion 51C and the passage 51B constitute a part of the air passage 26. That is, the passage 51B communicates with the bottom portion of the piston 40 via the through hole 52, and further communicates with the inside of the fuel tank 94. In consequence, the fuel and the gas evaporated from the fuel can flow through the passage 51B formed between the base plate and the spring 56 to enter the lower portion of the piston 40 via the concave portion 51C and the through hole 52. The base plate 51 is provided with a cutout portion 51D cut into a rectangular shape in the base plate 51. This cutout portion 51D is disposed at such a position as to face the passage 51B to position the passage 51B.

Moreover, when the fuel tank 94 tilts (e.g., the fuel tank tilts at 10 degrees to 45 degrees), the fuel of the fuel tank 94 reaches the filler cap 10. The fuel which has reached the filler cap 10 flows through the passage 51B disposed at the base plate 51, enters the valve mechanism portion 28 and enters the piston 40 side from the through hole 52. In a case where the fuel enters the bottom portion of the piston 40 provided with the float function, the piston 40 floats owing to the fuel which has entered the bottom portion, and the float 32 and the spherical member 30 also rise (move toward the insertion hole 22 in this case).

Furthermore, when the fuel tank 94 tilts (e.g., the tank tilts at 45 degrees or more), the fuel of the fuel tank 94 reaches the filler cap 10. Furthermore, the fuel flows through the passage 51B disposed at the base plate 51, enters the valve mechanism portion 28 and is rapidly jetted toward the piston 40 from the through hole 52. When the fuel is rapidly jetted to the bottom portion of the piston 40 provided with the float function, the piston 40 momentarily floats owing to the jetted fuel, and the float 32 and the spherical member 30 rise in cooperation with the piston.

Figure 33:
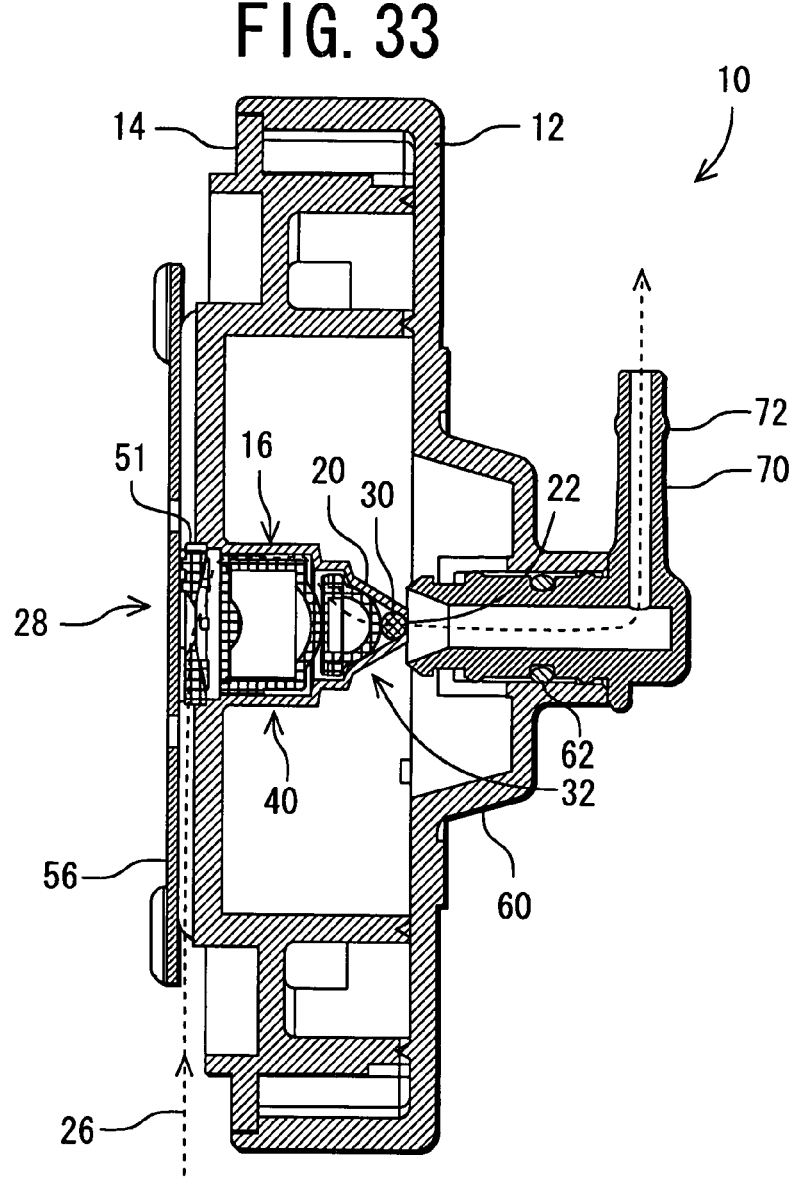
FIG. 33 is a longitudinal side view of the filler cap of the fuel tank according to the present invention (in a state in which a pipe is attached to the center of an outer lid)

Next, assembling of the filler cap 10 of the fuel tank 94 constituted as described above will be described with reference to FIGS. 20 and 33. First, a filter 50 formed of sponge is inserted around the tube main body 16, and a gasket 54 is then disposed on the filter (on the side of the fuel tank 94) (shown in FIG. 7. In FIG. 33, the filter 50 and the gasket 54 are omitted). Subsequently, the spherical member 30, the float 32 and the piston 40 are inserted into the tube main body 16 in order from the side of the insertion hole 22 of the reduced diameter portion 20 (a solid-line arrow of FIG. 20).

Subsequently, the base plate 51 and the fixing holes 57 are mounted in order on the piston 40 (the fuel tank 94 side). Moreover, the inner lid 14 and the spring 56 are caulked and fixed via rivets 58 (shown in FIG. 7, but the rivet 58 is omitted in FIG. 33). In consequence, the filler cap 10 of the fuel tank 94 is completed. That is, the filler cap 10 is assembled in the same manner as in Embodiment 1.

Next, the air passage 26 of the filler cap 10 of the fuel tank 94 will be described in detail. The air passage 26 is shown by dotted-line arrows of FIGS. 28, 29. It is to be noted that in FIG. 29, an outer diameter of the float 32 is formed to be smaller than that of the piston 40. In consequence, the outer diameter of the tube-like portion 18 on the piston 40 side is set to be smaller than that of the tube-like portion on the float 32 side. The diameter of the piston 40 is constituted to be shorter than a length of the piston 40 in the direction of the float 32 and the base plate 51. Therefore, a frictional resistance between the periphery of the piston 40 and the inner surface of the tube-like portion 18 is reduced to increase the buoyancy.

First, the air passage 26 in a case where the piston 40 is positioned away from the insertion hole 22 (on the fuel tank 94 side) in a usual use state in which the fuel tank 94 does not tilt will be described. In this case, the spherical member 30 is positioned (drops down) on the float 32 side from the insertion hole 22 owing to the gravity, and the semispherical portion 36 of the float 32 and the piston 40 are also positioned on the base plate 51 side from the insertion hole 22 owing to the gravity.

The air passage 26 extends through the insertion hole 22 from the outside, and extends through the gap between the inner surface of the reduced diameter portion 20 and the spherical member 30 and the gap between the inner surface of the tube-like portion 18 and the tube ribs 34A arranged at the periphery of the tube portion 34 of the float 32 to reach the gap between the float 32 and the piston 40. Subsequently, the air passage reaches the air passing groove 40D disposed at the side surface of the intermediate diameter portion 40C from the gap between the inner surface of the tube-like portion 18 and the vertical ribs 40A arranged at the periphery of the small diameter portion 40B of the piston 40.

Subsequently, the air passage 26 extends from the side surface of the large diameter portion 40E through the gap between the piston 40 and the base plate 51, and extends through the through hole 52 and the passage 51B of the base plate 51 to reach the inside of the fuel tank 94. That is, the valve mechanism portion 28 allows the inside of the fuel tank 94 to communicate with the outside via the air passage 26 in the opened state of the valve. In other words, during the usual use state of the car 100, the inside of the fuel tank 94 communicates with the outside via the air passage 26.

Furthermore, in a case where the fuel inlet 95 of the fuel tank is closed with the filler cap 10 and the fuel stored in the fuel tank 94 is consumed, outside air can be introduced into the fuel tank 94 from the air passage 26 to compensate for a volume of the consumed fuel. In a case where the fuel stored in the fuel tank 94 is not consumed, the gas evaporated from the fuel stored in the fuel tank 94 can be discharged from the air passage 26 disposed at the cap main body 11.

Moreover, when the piston 40 is positioned on the insertion hole 22 side (on the side opposite to the fuel tank 94), the spherical member 30 comes in contact with the inner surface of the reduced diameter portion 20. At this time, the spherical member 30 comes in linear contact with the semispherical portion 36 of the float 32. Moreover, the spherical member 30 and the semispherical portion 36 of the float 32 come in linear contact with the inner surface of the slant portion 38 of the tube main body 16. In consequence, the air passage 26 of the valve mechanism portion 28 is closed, and the air passage 26 which allows the inside of the fuel tank 94 to communicate with the outside is closed.

That is, in a case where the fuel tank 94 tilts until the liquid surface of the fuel stored in the fuel tank 94 reaches the valve mechanism portion 28 disposed at the filler cap 10, the fuel stored in the fuel tank 94 flows through the passage 51B of the base plate 51 to enter the tube main body 16 (the valve mechanism portion 28) from the through hole 52. When the fuel enters the tube main body 16, the buoyancy is generated by the fuel, and the piston 40 moves toward the insertion hole 22. Moreover, the float 32 is pushed up by the piston 40 to press the spherical member 30 onto the inner surface of the reduced diameter portion 20 and close the air passage 26.

Moreover, in a case where the fuel tank 94 tilts at 90 degrees or more, since the spherical member 30 is made of a metal having a specific gravity larger than that of the fuel, the spherical member drops down owing to the weight thereof to come in contact with the inner surface of the reduced diameter portion 20, and closes the air passage 26 of the reduced diameter portion 20. At this time, since the fuel liquid surface is positioned above the filler cap 10, owing to the gravity generated by the liquid surface differential pressure of this fuel, the piston 40 and the float 32 press the spherical member 30 positioned below the piston and the float onto the inner surface of the reduced diameter portion 20 to close the air passage 26.

That is, the spherical member 30 drops down toward the insertion hole 22 owing to the weight thereof, and the liquid surface differential pressure gravity of the fuel is additionally applied to the piston 40 to quickly press the spherical member 30 onto the inner surface of the reduced diameter portion 20 and close the air passage 26. Therefore, the piston 40 having the buoyancy and the valve mechanism portion 28 including the float 32 and the spherical member 30 are remarkably effective in preventing a disadvantage that the fuel leaks outwards from a time when the fuel tank 94 starts tilting until the tank tilts at a tilt angle of 360 degrees.

That is, when the fuel tank 94 tilts at a small tilt angle, the pressure to press the spherical member 30 onto the inner surface of the reduced diameter portion 20 is increased to increase a capability of closing the air passage 26 of the reduced diameter portion 20. In this case, the piston 40 may be provided with the float function (the buoyancy). In consequence, the pressure to press the spherical member 30 onto the inner surface of the reduced diameter portion 20 can be increased.

Moreover, when an outside air temperature rises to raise the temperature of the fuel tank 94, the temperature of the fuel stored in the fuel tank 94 also rises. In consequence, when the pressure of the fuel tank 94 rises owing to the gas evaporated from the fuel, the gas which cannot escape to a portion other than the air passage 26 flows through the air passage, and is discharged to the outside (the atmosphere). At this time, the force to float the piston 40 at the gas pressure increases. Moreover, the air passing groove 40D (the air passage 26) is disposed at the side surface of the piston 40 to reduce the resistance of the gas flowing through the side surface of the piston 40. In consequence, the gas is easily discharged from the fuel tank 94, and it is prevented that the piston 40 rises to lift up the float 32 and the spherical member 30.

That is, the piston 40, the float 32 and the spherical member 30 disposed at the tube main body 16 move downwards (toward the fuel tank 94) owing to the weights thereof to allow the inside of the fuel tank 94 to communicate with the outside via the air passage 26. In this case, since the piston 40 is constituted to be larger than the piston 40 according to Embodiments 1, 2, the weight of the piston 40 can be increased. In consequence, in a case where the fuel returns to the fuel tank 94, the weight of the piston 40 is further added, the speed at which the piston 40 moves toward the fuel tank 94 also increases, and the piston can drop down fast. Moreover, the air passing groove 40D is disposed so as to reduce air resistance between the piston 40 and the tube-like portion 18. In consequence, since the air is easily sucked and discharged via the air passage 26, the gas evaporated from the fuel stored in the fuel tank 94 can be discharged from the air passage 26, and the inside of the fuel tank 94 can be retained at an atmospheric pressure.

Moreover, when the fuel enters the valve mechanism portion 28, the piston 40 moves obliquely upwards owing to the buoyancy until the fuel tank 94 tilts at 45 degrees. Subsequently, the piston is continuously pressed onto the spherical member 30 to continuously close the air passage 26 of the reduced diameter portion 20. As long as the air passage 26 of the reduced diameter portion 20 is continuously closed with such a spherical member 30, the fuel leakage from the air passage 26 is inhibited. In a state in which the large diameter portion 40E of the lower portion of the piston 40 faces the lower portion of the inner surface of the tube-like portion 18, the fuel enters the gap between the inner surface of the tube-like portion 18 and the outer surface of the large diameter portion 40E, and the gap is sealed with the fuel. In consequence, the fuel can be prevented from invading the upper portion of the piston 40. Therefore, even in a case where the fuel tank 94 tilts or falls, a time elapsed until the fuel leaks from the insertion hole 22 (the filler cap 10) can largely be lengthened.

Furthermore, when the fuel tank 94 falls or tilts, the spherical member 30 is pressed onto the inner surface of the reduced diameter portion 20 by the piston 40 to once close the air passage 26. Subsequently, in a case where the fuel tank 94 returns to the horizontal state, the fuel which has entered the tube-like portion 18 returns to the fuel tank 94 owing to the weight of the fuel itself. In a case where such a fuel returns to the fuel tank 94, the inside of the tube-like portion 18 is sucked with the fuel. Therefore, the lower portion of the piston 40 obtains a negative pressure. When the lower portion of the piston 40 obtains the negative pressure, the piston 40 moves from the tube-like portion 18 toward the fuel tank 94 owing to the negative pressure of the lower portion of the piston. When the piston 40 moves toward the fuel tank 94, the float 32 and the spherical member 30 also move toward the fuel tank 94, and the air passage 26 of the reduced diameter portion 20 closed with the spherical member 30 is opened. Moreover, the air passing groove 40D is opened.

When the insertion hole 22 is opened, the outside communicates with the inside of the fuel tank 94 to maintain the inside of the fuel tank 94 at an outside air pressure. The fuel of the gap between the piston 40 and the tube-like portion 18 sealed once does not easily dry, if the outside air is not sucked from the outside by the operation of the engine 90. Therefore, the sealed state is maintained. The air is sucked or discharged with respect to the outside and the inside of the fuel tank 94 via the air passage 26 (the air passing groove 40D) which is larger than the space between the piston 40 and the tube-like portion 18. The fuel which has invaded the gap between the piston 40 and the tube-like portion 18 does not easily dry.

Moreover, after the air passage 26 is once closed with the spherical member 30 pressed onto the inner surface of the reduced diameter portion 20, the fuel tank 94 returns to the horizontal state. In this state, even when the fuel is consumed by the engine 90 to obtain the negative pressure in the fuel tank 94, the gap between the periphery of the piston 40 and the tube-like portion 18 remains to be sealed with the fuel. At this time, the air passing groove 40D communicates with the insertion hole 22 and the inside of the fuel tank 94.

Furthermore, when the fuel tank 94 is horizontally disposed (the filler cap 10 is higher than the liquid surface of the fuel stored in the fuel tank 94), the outside air temperature rises, and a gas pressure rises in the fuel tank 94. In this case, a possibility is considered that the piston 40 rises owing to the gas discharged from the air passage 26. However, since the fuel liquid surface of the fuel tank 94 is insulated from the filler cap 10, the piston 40 does not float.

In this case, the gravity functions in a direction in which the piston 40, the float 32 and the spherical member 30 drop down toward the fuel tank 94 owing to the weights of them, and the gas evaporated from the fuel stored in the fuel tank 94 flows through the air passing groove 40D (the air passage 26) and is discharged from the insertion hole 22. That is, owing to a weak gas pressure only evaporated from the fuel stored in the fuel tank 94, the piston 40 does not rise, and the lower portion of the tube main body 16 is not closed with the large diameter portion 40E. Therefore, the air passage 26 (the air passing groove 40D) remains to be opened.

In addition, in a case where the outside air temperature rises and the pressure in the fuel tank 94 rises owing to the evaporated gas, the air passage 26 (the air passing groove 40D) is opened. Therefore, the gas stored in the fuel tank 94 flows through the air passage 26 and is discharged from the insertion hole 22. While the gas stored in the fuel tank 94 is discharged from the air passage 26, the fuel with which the gap between the piston 40 and the tube-like portion 18 has been sealed is gasified and discharged to cancel the seal between the piston 40 and the tube-like portion 18.

In a case where the seal is canceled, the gap between the piston 40 and the tube-like portion 18 also functions as the air passage 26 through which the gas flows, and the gas of the fuel tank 94 is discharged from the insertion hole 22. In consequence, the pressure of the fuel tank 94 drops, and the gas pressure applied from the fuel tank 94 to the bottom portion of the piston 40 further decreases. In consequence, since the weights of the piston 40, the float 32 and the spherical member 30 are applied toward the fuel tank 94, a disadvantage is not caused that the spherical member 30 is pressed onto the inner surface of the reduced diameter portion 20 to close the air passage 26.

Moreover, after the fuel tank 94 continuously tilts or falls several times (twice or more), the fuel tank 94 returns to the horizontal state. In this case, there is hardly a drying time of the fuel with which the gap between the piston 40 and the tube-like portion 18 is sealed. In this case, the gap between the outer surface of the large diameter portion 40E and the tube-like portion 18 remains to be sealed. However, since the fuel tank 94 has the horizontal state, the air passing groove 40D is opened to open the air passage 26. Furthermore, when the fuel tank 94 tilts and the fuel is jetted from the through hole 52 to the lower portion of the piston 40, the piston 40 immediately rises to close the air passage 26 of the reduced diameter portion 20 with the spherical member 30. In consequence, the fuel leakage from the insertion hole 22 is prevented.

On the other hand, in the conventional filler cap, all the gas evaporated from the fuel stored in the fuel tank 94 is discharged from an air passing port disposed at the filler cap to the atmosphere to set the inside of the fuel tank 94 to the atmospheric pressure. However, in the present invention, the buoyancy is generated in the piston 40, and the spherical member 30 is moved toward the insertion hole 22 with both of the jetting pressure of the fuel and the buoyancy. In consequence, even if the fuel tank 94 has a small tilt angle, the air passage 26 of the reduced diameter portion 20 can quickly be closed with the spherical member 30. When the fuel tank 94 is horizontally disposed, the VOC gas discharged from the insertion hole 22 having a small diameter can be suppressed. Therefore, since the pressure of the fuel tank 94 is higher than the atmospheric pressure, the evaporation of the fuel stored in the fuel tank 94 can be inhibited, and the fuel leakage can economically be prevented.

The tube portion 34 of the float 32 is thinned to reduce a capacity, and the weight of the float is reduced to secure a degree of freedom in an operation. Moreover, the adsorption between the inner surface of the tube-like portion 18 and the float 32 is prevented by the tube ribs 34A. In consequence, the float 32 is smoothly vertically moved, and a burden on the piston 40 in floating the float 32 is reduced. Since the piston 40 is provided with a float effect, the floating speed of the piston 40 is increased. In consequence, the spherical member 30 of the float 32 can be pressed onto the inner surface of the reduced diameter portion 20 faster.

Furthermore, when the rising speed of the piston 40 is increased, the pressure of the tube main body 16 can be raised in a short time. In consequence, the pressure of the tube main body 16 is balanced with that of the fuel tank 94, and the pressure is set to be equal to that of the fuel tank. It can thus securely be prevented that the fuel enters the tube main body 16 from the fuel tank 94.

The filler cap 10 constituted in this manner was attached to the fuel tank 94, and the tilt angle of the fuel tank 94 was set to 20 degrees to 90 degrees to conduct a leakage test. It has been found that the leakage of the fuel from the filler cap 10 is reduced. A result of the test is shown in the following table.

| Tilt angle of fuel tank 94 | Time to leave tank to stand | Fuel leakage from filler cap 10 |
|---|---|---|
| 1) 20 degrees | 10 minutes | No leakage |
| 2) 30 degrees | 10 minutes | No leakage |
| 3) 45 degrees | 10 minutes | No leakage |
| 4) 70 degrees | 1 minute | No leakage |
| 5) 90 degrees | 1 minute | No leakage |

That is, the piston 40 having the float function is capable of more securely preventing the fuel stored in the fuel tank 94 from leaking from the filler cap 10 than the piston 40 which does not have any float function.

An operation of the valve mechanism portion 28 constituted in this manner will be described in more detail. It is to be noted that the operation of the valve mechanism portion 28 in (10) a case where the fuel tank 94 tilts at 30 degrees to 45 degrees and (11) a case where the fuel tank 94 tilts at 45 degrees or more will be described in order.

(10) The Case where the Fuel Tank 94 Tilts at 30 Degrees to 45 Degrees

When the fuel tank 94 tilts at 30 degrees to 45 degrees, the fuel stored in the fuel tank 94 is discharged from the fuel inlet 95 of the fuel tank to enter the filler cap 10 (the valve mechanism portion 28). In this case, when the fuel tank 94 tilts at 30 degrees to 45 degrees, the fuel stored in the fuel tank 94 flows through the passage 51B disposed at the base plate 51 to enter the valve mechanism portion 28. The piston 40 is raised owing to the jetting pressure of the fuel which has entered the valve mechanism portion 28 and the buoyancy, and the float 32 and the spherical member 30 are raised in cooperation with the piston, and the air passage 26 of the reduced diameter portion 20 is closed with the raised spherical member 30.

When the fuel enters the valve mechanism portion, the piston 40 rises owing to the buoyancy, and the large diameter portion 40E of the piston 40 floats to the lowermost portion of the position where the large diameter portion faces the tube-like portion 18 (in a state in which the large diameter portion 40E starts facing the inner surface of the tube-like portion 18). At this time, at the position where the large diameter portion 40E faces the tube-like portion 18, the gap between the periphery of the piston 40 (the periphery of the large diameter portion 40E) and the tube-like portion 18 is minimized. In consequence, since the tube-like portion 18 (the air passage 26) is closed, and the fuel penetrates the gap between the large diameter portion 40E and the tube-like portion 18. In this state, the gap between the piston 40 (the large diameter portion 40E) and the tube-like portion 18 is sealed, and the fuel is prevented from entering the tube-like portion 18 from below.

Moreover, when the fuel enters the lower portion of the piston 40, the piston 40 further rises. At this time, the buoyancy of the piston 40 functions in a vertical direction. Furthermore, in a case where the fuel tank 94 further tilts, the piston 4 moves toward the insertion hole 22 owing to the buoyancy against the resistance between the piston and the inner surface of the tube-like portion 18 until the tank tilts at 45 degrees. The spherical member is then pressed toward the insertion hole 22 by the piston 40 (the function of the float 32), and pressed onto the inner surface of the reduced diameter portion 20 to close the air passage 26 of the reduced diameter portion 20.

In a case where the air passage 26 is closed, the air (the gas) which has already entered the tube main body 16 is not discharged from the insertion hole 22, and is compressed by the piston 40 to balance the pressure with the differential pressure (the liquid pressure) at the fuel height of the fuel tank 94. The compressed gas of the tube main body 16 cannot flow in reverse to the fuel tank 94 against the liquid pressure at the fuel height of the fuel tank 94. That is, when the compressed gas is discharged from the insertion hole 22 and the pressure of the tube-like portion 18 is not reduced, the fuel of the fuel tank 94 cannot invade the tube-like portion 18. Therefore, the fuel can be prevented from leaking from the insertion hole 22 disposed at the tip end of the tube-like portion 18.

Moreover, when the tilted fuel tank 94 returns to the horizontal state, the piston 40 moves (drops down) toward the fuel tank 94 owing to suction and negative pressure generated at a time when the fuel of the tube main body 16 (especially, the lower portion of the piston 40 including the passage 51B) returns to the fuel tank 94. That is, when atmospheric air enters the tube-like portion 18 from the insertion hole 22, the fuel which has entered the tube-like portion 18 from below drops down (moves) toward the fuel tank 94 to return to the fuel tank 94. In consequence, the piston 40 also moves toward the fuel tank 94, the large diameter portion 40E of the lower portion of the piston 40 with which the lowermost portion of the tube main body 16 (the air passage 26) has been closed moves toward the stepped portion 19 to open the air passage 26, and the air passage 26 allows the outside to communicate with the inside of the fuel tank 94 via the insertion hole 22.

Specifically, the inside of the fuel tank 94 communicates with the outside via the air passage 26 successively connected to the passage 51B, the through hole 52, the air passing groove 40D, the gap between the horizontal ribs 51A, the gap between the vertical ribs 40A, the gap between the tube ribs 34A, the gap between the reduced diameter portion 20 and the semispherical portion 36, the gap between the reduced diameter portion 20 and the spherical member 30 and the insertion hole 22. In consequence, when the engine 90 is operated to consume the fuel, the outside air can be introduced into the fuel tank 94 from the air passage 26. Therefore, when the engine 90 is operated to consume the fuel, it is possible to securely prevent a disadvantage that the inside of the fuel tank 94 obtains the negative pressure and that the fuel does not easily flow toward the vaporizer 92.

(11) The Case where the Fuel Tank 94 Tilts at 45 Degrees or More

When the fuel tank 94 tilts at 45 degrees or more (45 degrees or more and less than 90 degrees), the fuel stored in the fuel tank 94 is discharged to the fuel inlet 95 of the fuel tank owing to the gravity to enter the filler cap 10 (the valve mechanism portion 28). That is, when the tilt angle of the fuel tank 94 exceeds 45 degrees, the fuel stored in the fuel tank 94 flows through the passage 51B disposed at the base plate 51 to enter the bottom portion of the piston 40 of the valve mechanism portion 28.

Moreover, a large buoyancy is generated in the piston 40 owing to the differential pressure of the fuel which has entered the bottom portion of the piston 40. When the fuel position in the fuel tank 94 is further higher than the position of the filler cap 10 and the differential pressure of the fuel increases, the piston 40, the float 32 and the spherical member 30 rise upwards (toward the insertion hole 22). When the fuel enters the valve mechanism portion 28, the piston 40 momentarily rises owing to the buoyancy, the float 32 and the spherical member 30 also rise in cooperation with the piston, and the air passage 26 of the reduced diameter portion 20 is momentarily closed with the raised spherical member 30.

When such a fuel tank 94 tilts at 45 degrees or more and below 90 degrees, the buoyancy of the piston 40 vertically functions. Therefore, the resistance between the piston 40 and the inner surface of the tube-like portion 18 increases, and the force to move the spherical member 30 toward the insertion hole 22 owing to the buoyancy of the piston 40 decreases. When the fuel tank 94 tilts at 90 degrees or more, the buoyancy is applied to the float 32 and the piston 40 in the fuel tank 94 direction. However, the liquid pressure applied to the bottom portion of the piston 40 is larger than the buoyancy, the piston 40 cannot float on the fuel tank 94 side. At this time, the large diameter portion 40E faces the inner surface of the lower portion of the tube-like portion 18, and the air passing groove 40D (the air passage 26) remains to be closed.

As described above, during the usual use of the car 100, the piston 40 is constituted into such a dimension that the fuel can flow through the gap between the piston 40 (the large diameter portion 40E) and the inner surface of the tube main body 16 (the stepped portion 19). When the piston 40 moves outwards (toward the insertion hole 22), the piston is constituted into such a dimension that the fuel cannot flow through the gap between the piston 40 and the inner surface of the tube main body 16 (the gap between the large diameter portion 40E and the inner surface of the tube-like portion 18) before the spherical member 30 is pressed onto the inner surface of the reduced diameter portion 20 of the tube main body 16 by the float 32.

Furthermore, the side surface of the piston 40 (the side surface of the intermediate diameter portion 40C) is provided with the fuel passage permitting portion (the air passing groove 40D) which allows the fuel to flow through the gap between the intermediate diameter portion 40C and the inner surface of the tube main body 16 (the tube-like portion 18). On the side of the fuel tank 94 from this air passing groove 40D, the large diameter portion 40E is disposed closer to the inner surface of the tube-like portion 18 than the air passing groove 40D. The gap between the large diameter portion 40E and the inner surface of the tube main body 16 (the stepped portion 19) during the usual use of the car 100 is constituted into such a dimension that the fuel can flow through the gap. When the piston 40 moves toward the insertion hole 22, the large diameter portion 40E moves to a position where the portion faces the inner surface of the tube-like portion 18. The gap between the large diameter portion and the inner surface of the tube-like portion 18 is constituted into such a dimension that the fuel cannot flow through the gap.

In consequence, when the fuel tank 94 tilts and the fuel enters the tube main body 16, the fuel is first inhibited from entering the tube main body 16 by the large diameter portion 40E and the inner surface of the tube-like portion 18. The spherical member 30 can then be pressed onto the inner surface of the reduced diameter portion 20 of the tube main body 16 to close the air passage 26. Therefore, when the fuel tank 94 tilts and the fuel enters the tube main body 16, the air passage 26 can momentarily be closed. Therefore, it is possible to effectively prevent a disadvantage that the fuel which has entered the tube main body 16 is discharged from the insertion hole 22.

Especially, the air passage 26 of the tube-like portion 18 can be closed with the large diameter portion 40E immediately before the piston 40 floats to press the spherical member 30 onto the inner surface of the reduced diameter portion 20 and close the air passage 26. Therefore, it is possible to prevent in advance a disadvantage that the fuel of the fuel tank 94 is discharged from the filler cap 10.

In consequence, it is possible to securely inhibit a disadvantage that the fuel is discharged from the gap of the filler cap 10 in a case where the fuel tank 94 tilts. Therefore, it is possible to momentarily and strongly inhibit a danger that the fuel is discharged from the filler cap 10. The convenience of the filler cap 10 can further be improved. It is to be noted that even in a case where the pipe 70 is attached to the cap main body 11 (shown in FIG. 33), an effect similar to that of Embodiment 2 can be produced.

Embodiment 4

Figure 34:
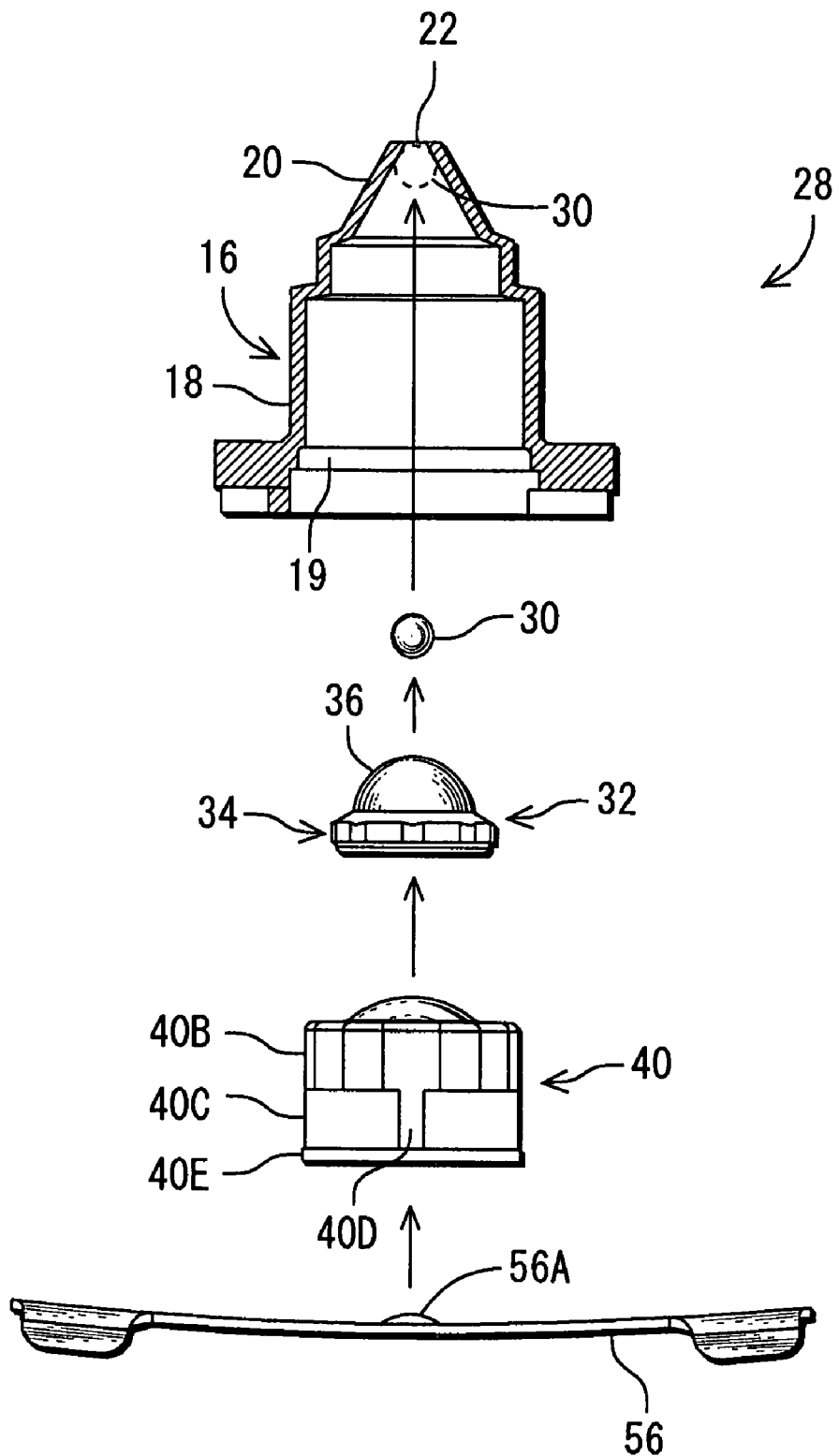
FIG. 34 is an assembly diagram of a valve mechanism portion including a protruding portion disposed at a base plate (Embodiment 4).

Next, FIG. 34 shows a filler cap 10 of a fuel tank 94 according to another embodiment of the present invention. The filler cap 10 of the fuel tank 94 substantially has the same constitution as that of the above embodiment. Different parts will hereinafter be described. It is to be noted that the same parts as those of the above embodiment are denoted with the same reference numerals and description thereof is omitted. FIG. 34 also shows a valve mechanism portion 28 of the filler cap 10. In the filler cap 10 of the fuel tank 94, a spring 56 is provided with a protruding portion 56A which protrudes toward a piston 40. FIG. 34 shows components of the valve mechanism portion 28 only.

This protruding portion 56A is formed into a semispherical shape, and disposed so as to substantially face the center of a lower portion of the piston 40. Moreover, in a case where this spring 56 is fixed to an inner lid 14, in a state in which a base plate 51 is not used and the protruding portion 56A is protruded to the lower portion of the piston 40, the spring is fixed to the inner lid 14 via rivets 58 in the same manner as described above.

In a case where the spring 56 is used, when the piston 40 drops down and the lower surface of the piston comes in contact with the protruding portion 56A, as shown in FIG. 29, a air passage 26 is secured. In this case, a lower surface of the inner lid 14 is recessed toward the piston 40, and a height of the protruding portion 56A is increased to secure the air passage 26 as shown in FIG. 29. In consequence, since the base plate 51 can be omitted, in addition to the above effects, cost of the filler cap 10 can further be reduced. It is to be noted that FIG. 34 shows a tube main body 16 in a vertically sectional view and other components in a front view.

It is to be noted that in the embodiment, the inner lid 14 is provided with two annular protrusions 23, but the number of the annular protrusions 23 is not limited to two. One or two or more annular protrusions may be disposed. The annular protrusions 23 are provided with six grooves 24, but the number of the grooves 24 is not limited to six, and one to five or six or more grooves may be disposed.

Moreover, in the embodiments, the piston and the float are made of nylon 6, or nylon 6, 6, but even if the piston and the piston are made of another synthetic resin or a metal, the present invention is effective. The piston (excluding Embodiment 1) and the float are constituted to be hollow. As long as the specific gravities of the piston and the float are smaller than the specific gravity of the fuel, the piston 40 and the float 32 do not have to be constituted to be hollow.

Furthermore, in the embodiments, the float 32 and the piston 40 are separately constituted, but the float 32 and the piston 40 do not have to be constituted. Even if the float and the piston are integrated, the present invention is effective. In this case, since manufacturing of the float 32 or the piston 40 can be simplified, the cost of the valve mechanism portion 28 can further be reduced, and engine cost can largely be reduced.

In addition, the gasoline has been described as the fuel, but the fuel is not limited to the gasoline, and even if light oil, ethanol, methanol, a mixture of them or the like is used, the present invention is effective.

Needless to say, the present invention is not limited to the above embodiments only, and even if the present invention is variously modified without departing from the scope of this invention, the present invention is effective.

What is claimed is:

1. A filler cap of a fuel tank comprising: a cap main body attached to a fuel inlet of the fuel tank,
   the cap further comprising: an air passage which is constituted at the cap main body and which allows the inside of the fuel tank to communicate with the outside; and a valve mechanism portion constituted at this air passage,
   the valve mechanism portion including a tube main body having a cylindrical portion and a reduced diameter portion formed externally and continuously from this cylindrical portion, a float stored in the tube main body with a space between the float and an inner surface of this tube main body, a piston positioned on a fuel tank side of this float and stored in the tube main body with a space between the piston and the inner surface of the tube main body, and a spherical member positioned on an outer side of the float and stored in the tube main body,
   wherein, in a case where the fuel enters the tube main body, the piston moves toward the outside, the float floats toward the outside and the spherical member is pressed onto the reduced diameter portion of the tube main body by the float to close the air passage.

2. The filler cap of the fuel tank according to claim 1, further comprising: a pipe which is rotatably attached to the cap main body to communicate with the air passage and which is connected to a canister or a vaporizer via a hose.

3. The filler cap of the fuel tank according to claim 1 or 2, wherein the piston is provided with a function of the float and, in a case where the fuel enters the tube main body, the piston obtains buoyancy to float toward the outside together with the float.

4. The filler cap of the fuel tank according to claim 1 or 2, wherein the piston constantly allows the fuel to flow through the space between the piston and the inner surface of the tube main body and, in a case where the piston moves toward the outside, the space between the piston and the inner surface of the tube main body is set to such a dimension that the fuel cannot flow through the space, before the spherical member is pressed onto the reduced diameter portion of the tube main body by the float.

5. The filler cap of the fuel tank according to claim 4, further comprising:

a fuel passage permitting portion which is formed at an outer portion of a side surface of the piston and which permits the fuel to flow through the space between the piston and the inner surface of the tube main body; and a closing portion which is formed at the side surface of the piston on the side of the fuel tank from the fuel passage permitting portion and which is disposed close to the inner surface of the tube main body than the fuel passage permitting portion, wherein a space between this closing portion and the inner surface of the tube main body is set to such a dimension that the fuel flows through the space and, in a case where the piston moves toward the outside, the closing portion moves to a position where the closing portion faces the inner surface of the tube main body, and the space between the closing portion and the inner surface of the tube main body is set to such a dimension that the fuel does not flow through the space.

* * * * *